US011114063B2

(12) United States Patent
Woodgate et al.

(10) Patent No.: US 11,114,063 B2
(45) Date of Patent: Sep. 7, 2021

(54) PRIVACY DISPLAY APPARATUS

(71) Applicant: RealD Spark, LLC, Beverly Hills, CA (US)

(72) Inventors: Graham J. Woodgate, Henley-on-Thames (GB); Jonathan Harrold, Upper Heyford (GB); Michael G. Robinson, Boulder, CO (US); Robert A. Ramsey, Boulder, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 17/061,118

(22) Filed: Oct. 1, 2020

(65) Prior Publication Data

US 2021/0104209 A1    Apr. 8, 2021

Related U.S. Application Data

(60) Provisional application No. 62/909,574, filed on Oct. 2, 2019, provisional application No. 62/943,931, filed on Dec. 5, 2019, provisional application No. 62/949,914, filed on Dec. 18, 2019, provisional application No. 62/979,598, filed on Feb. 21, 2020, provisional application No. 63/002,807, filed on Mar. 31, 2020.

(51) Int. Cl.
*G09G 5/10* (2006.01)
*G09G 3/34* (2006.01)
*G06F 21/84* (2013.01)

(52) U.S. Cl.
CPC .............. *G09G 5/10* (2013.01); *G06F 21/84* (2013.01); *G09G 3/3406* (2013.01); *G09G 2358/00* (2013.01); *G09G 2360/144* (2013.01); *G09G 2380/10* (2013.01)

(58) Field of Classification Search
CPC ................................................ G09G 3/3406
See application file for complete search history.

(56) References Cited

U.S. PATENT DOCUMENTS

| 4,621,898 A | 11/1986 | Cohen |
| 4,974,941 A | 12/1990 | Gibbons et al. |

(Continued)

FOREIGN PATENT DOCUMENTS

| CA | 2222313 A1 | 6/1998 |
| CN | 1125943 C | 10/2003 |

(Continued)

OTHER PUBLICATIONS

Adachi, et al. "P-228L: Late-News Poster: Controllable Viewing-Angle Displays using a Hybrid Aligned Nematic Liquid Cell", ISSN, SID 2006 Digest, pp. 705-708.

(Continued)

*Primary Examiner* — Gustavo Polo
(74) *Attorney, Agent, or Firm* — Penny L. Lowry

(57) ABSTRACT

A control system for a switchable privacy display apparatus comprises an ambient light sensor and a display luminance controller arranged to control the luminance of the display in response to measured illuminance. High image visibility is provided for public mode operation while in privacy mode visual security level above a perceived privacy threshold may be obtained by means of control of image luminance, in response to the output of the ambient light sensor.

33 Claims, 23 Drawing Sheets

(56) References Cited

U.S. PATENT DOCUMENTS

| | | |
|---|---|---|
| 5,005,108 A | 4/1991 | Pristash et al. |
| 5,035,491 A | 7/1991 | Kawagishi et al. |
| 5,658,490 A | 8/1997 | Sharp et al. |
| 5,715,028 A | 2/1998 | Abileah et al. |
| 5,808,784 A | 9/1998 | Ando et al. |
| 5,835,166 A | 11/1998 | Hall et al. |
| 5,894,361 A | 4/1999 | Yamazaki et al. |
| 5,914,760 A | 6/1999 | Daiku |
| 6,055,103 A | 4/2000 | Woodgate et al. |
| 6,099,758 A | 8/2000 | Verrall et al. |
| 6,144,433 A | 11/2000 | Tillin et al. |
| 6,204,904 B1 | 3/2001 | Tillin et al. |
| 6,222,672 B1 | 4/2001 | Towler et al. |
| 6,392,727 B1 | 5/2002 | Larson et al. |
| 6,437,915 B2 | 8/2002 | Moseley et al. |
| 7,067,985 B2 | 6/2006 | Adachi |
| 7,163,319 B2 | 1/2007 | Kuo et al. |
| 7,227,602 B2 | 6/2007 | Jeon et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,098,350 B2 | 1/2012 | Sakai et al. |
| 8,154,686 B2 | 4/2012 | Mather et al. |
| 8,237,876 B2 | 8/2012 | Tan et al. |
| 8,249,408 B2 | 8/2012 | Coleman |
| 8,262,271 B2 | 9/2012 | Tillin et al. |
| 8,646,931 B2 | 2/2014 | Choi et al. |
| 8,801,260 B2 | 8/2014 | Urano et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 10,054,732 B2 | 8/2018 | Robinson et al. |
| 10,126,575 B1 | 11/2018 | Robinson et al. |
| 10,303,030 B2 | 5/2019 | Robinson et al. |
| 10,401,638 B2 | 9/2019 | Robinson et al. |
| 10,488,705 B2 | 11/2019 | Xu et al. |
| 10,649,248 B1 | 5/2020 | Jiang et al. |
| 10,649,259 B2 | 5/2020 | Lee et al. |
| 2002/0024529 A1 | 2/2002 | Miller et al. |
| 2002/0171793 A1 | 11/2002 | Sharp et al. |
| 2003/0089956 A1 | 5/2003 | Allen et al. |
| 2003/0107686 A1 | 6/2003 | Sato et al. |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0145703 A1 | 7/2004 | O'Connor et al. |
| 2004/0240777 A1 | 12/2004 | Woodgate et al. |
| 2005/0111100 A1 | 5/2005 | Mather et al. |
| 2005/0117186 A1 | 6/2005 | Li et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0219693 A1 | 10/2005 | Hartkop et al. |
| 2006/0066785 A1 | 3/2006 | Moriya |
| 2006/0082702 A1 | 4/2006 | Jacobs et al. |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0139772 A1 | 6/2007 | Wang |
| 2007/0223251 A1 | 9/2007 | Liao |
| 2007/0285775 A1 | 12/2007 | Lesage et al. |
| 2008/0068329 A1 | 3/2008 | Shestak et al. |
| 2008/0158491 A1 | 7/2008 | Zhu et al. |
| 2008/0285310 A1 | 11/2008 | Aylward et al. |
| 2008/0316198 A1 | 12/2008 | Fukushima et al. |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0128735 A1 | 5/2009 | Larson et al. |
| 2009/0128746 A1 | 5/2009 | Kean et al. |
| 2009/0174843 A1 | 7/2009 | Sakai et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0205667 A1 | 8/2010 | Anderson et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0241983 A1 | 10/2011 | Chang |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0086875 A1 | 4/2012 | Yokota |
| 2012/0127573 A1 | 5/2012 | Robinson et al. |
| 2012/0147280 A1 | 6/2012 | Osterman et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0327101 A1 | 12/2012 | Blixt et al. |
| 2013/0039062 A1 | 2/2013 | Vinther et al. |
| 2013/0100097 A1 | 4/2013 | Martin |
| 2013/0107174 A1 | 5/2013 | Yun et al. |
| 2013/0128165 A1 | 5/2013 | Lee et al. |
| 2013/0242231 A1 | 9/2013 | Kurata et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0111760 A1 | 4/2014 | Guo et al. |
| 2014/0132887 A1 | 5/2014 | Kurata |
| 2014/0201844 A1 | 7/2014 | Buck |
| 2014/0211125 A1 | 7/2014 | Kurata |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0268358 A1 | 9/2014 | Kusaka et al. |
| 2014/0286043 A1 | 9/2014 | Sykora et al. |
| 2014/0289835 A1 | 9/2014 | Varshavsky et al. |
| 2014/0361990 A1 | 12/2014 | Leister |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0301400 A1 | 10/2015 | Kimura et al. |
| 2015/0346417 A1 | 12/2015 | Powell |

(56) References Cited

U.S. PATENT DOCUMENTS

| | | |
|---|---|---|
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0090103 A1 | 3/2017 | Holman |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2018/0014007 A1 | 1/2018 | Brown |
| 2018/0052346 A1 | 2/2018 | Sakai et al. |
| 2018/0082068 A1 | 3/2018 | Lancioni et al. |
| 2018/0095581 A1 | 4/2018 | Hwang et al. |
| 2018/0113334 A1 | 4/2018 | Fang et al. |
| 2018/0188576 A1 | 7/2018 | Xu et al. |
| 2018/0188603 A1 | 7/2018 | Fang et al. |
| 2018/0196275 A1 | 7/2018 | Robinson et al. |
| 2018/0210243 A1 | 7/2018 | Fang et al. |
| 2018/0231811 A1 | 8/2018 | Wu |
| 2018/0252949 A1 | 9/2018 | Klippstein et al. |
| 2018/0259799 A1 | 9/2018 | Kroon |
| 2018/0259812 A1 | 9/2018 | Goda et al. |
| 2018/0321523 A1 | 11/2018 | Robinson et al. |
| 2018/0321553 A1 | 11/2018 | Robinson et al. |
| 2018/0329245 A1 | 11/2018 | Robinson et al. |
| 2018/0364526 A1 | 12/2018 | Finnemeyer et al. |
| 2019/0086706 A1 | 3/2019 | Robinson et al. |
| 2019/0121173 A1 | 4/2019 | Robinson et al. |
| 2019/0154896 A1 | 5/2019 | Yanai |
| 2019/0196236 A1 | 6/2019 | Chen et al. |
| 2019/0197928 A1 | 6/2019 | Schubert et al. |
| 2019/0215509 A1 | 7/2019 | Woodgate et al. |
| 2019/0227366 A1 | 7/2019 | Harrold et al. |
| 2019/0235304 A1 | 8/2019 | Tamada et al. |
| 2019/0250458 A1 | 8/2019 | Robinson et al. |
| 2019/0293858 A1 | 9/2019 | Woodgate et al. |
| 2019/0293983 A1 | 9/2019 | Robinson et al. |
| 2019/0353944 A1 | 11/2019 | Acreman et al. |
| 2020/0159055 A1 | 5/2020 | Robinson et al. |
| 2020/0225402 A1 | 7/2020 | Ihas et al. |

FOREIGN PATENT DOCUMENTS

| | | |
|---|---|---|
| CN | 1776484 A | 5/2006 |
| CN | 101681061 A | 3/2010 |
| CN | 104133292 A | 11/2014 |
| CN | 204740413 U | 11/2015 |
| CN | 209171779 U | 7/2019 |
| GB | 2418518 A | 3/2006 |
| GB | 2428100 A | 1/2007 |
| GB | 2482065 A | 1/2012 |
| GB | 2486935 B | 9/2013 |
| JP | H01130783 U | 9/1989 |
| JP | H11174489 A | 7/1999 |
| JP | 2007148279 A | 6/2007 |
| JP | 2007273288 A | 10/2007 |
| KR | 20120011228 A | 2/2012 |
| KR | 101990286 B1 | 6/2019 |
| TW | M537663 U | 3/2017 |
| WO | 2005071449 A2 | 8/2005 |
| WO | 2010021926 A2 | 2/2010 |
| WO | 2014011328 A1 | 1/2014 |
| WO | 2015040776 A1 | 3/2015 |
| WO | 2015057625 A1 | 4/2015 |
| WO | 2015143227 A1 | 9/2015 |
| WO | 2015157184 A1 | 10/2015 |
| WO | 2015190311 A1 | 12/2015 |
| WO | 2015200814 A1 | 12/2015 |
| WO | 2016195786 A1 | 12/2016 |
| WO | 2017050631 A1 | 3/2017 |
| WO | 2018035492 A1 | 2/2018 |
| WO | 2018208618 A1 | 11/2018 |
| WO | 2019055755 A1 | 3/2019 |
| WO | 2019067846 A1 | 4/2019 |
| WO | 2019147762 A1 | 8/2019 |

OTHER PUBLICATIONS

Brudy et al., "Is Anyone Looking? Mitigating Shoulder Surfing on Public Displays through Awareness and Protection", Proceedings of the International Symposium on Persuasive Displays (Jun. 3, 2014), pp. 1-6.
CN201780030715.3 Notification of the First Office Action dated Jan. 21, 2020.
EP-16860628.3 Extended European Search Report of European Patent Office dated Apr. 26, 2019.
EP-17799963.8 Extended European Search Report of European Patent Office dated Oct. 9, 2019.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International Preliminary Report on Patentability dated Nov. 21, 2019.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.

(56) References Cited

OTHER PUBLICATIONS

PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
PCT/US2020/060155 International search report and written opinion of the international searching authority dated Feb. 5, 2021.
PCT/US2020/060191 International search report and written opinion of the international searching authority dated Feb. 8, 2021.
Robson, et al. "Spatial and temporal contrast-sensitivity functions of the visual system", J. Opt. Soc. Amer., vol. 56, pp. 1141-1142 (1966).
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
PCT/US2020/053863 International search report and written opinion of the international searching authority dated Mar. 12, 2021.
PCT/US2020/063638 International search report and written opinion of the international searching authority dated Mar. 2, 2021.
PCT/US2020/064633 International search report and written opinion of the international searching authority dated Mar. 15, 2021.
Simonyan et al., "Very Deep Convolutional Networks for Large-Scale Image Recognition", ICLR 2015.
CN201880042320.X Notification of the First Office Action dated May 25, 2021.
EP-18855604.7 Extended European Search Report of European Patent Office dated Jun. 1, 2021.
EP-18857077.4 Extended European Search Report of European Patent Office dated Jun. 16, 2021.

Reflectivity

PRIVACY DISPLAY APPARATUS

TECHNICAL FIELD

This disclosure generally relates to illumination from light modulation devices, and more specifically relates to control of privacy display.

BACKGROUND

Privacy displays provide image visibility to a primary user that is typically in an on-axis position and reduced visibility of image content to a snooper, that is typically in an off-axis position. A privacy function may be provided by micro-louvre optical films that transmit some light from a display in an on-axis direction with low luminance in off-axis positions. However such films have high losses for head-on illumination and the micro-louvres may cause Moiré artefacts due to beating with the pixels of the spatial light modulator. The pitch of the micro-louvre may need selection for panel resolution, increasing inventory and cost.

Switchable privacy displays may be provided by control of the off-axis optical output.

Control may be provided by means of luminance reduction, for example by means of switchable backlights for a liquid crystal display (LCD) spatial light modulator. Display backlights in general employ waveguides and edge emitting sources. Certain imaging directional backlights have the additional capability of directing the illumination through a display panel into viewing windows. An imaging system may be formed between multiple sources and the respective window images. One example of an imaging directional backlight is an optical valve that may employ a folded optical system and hence may also be an example of a folded imaging directional backlight. Light may propagate substantially without loss in one direction through the optical valve while counter-propagating light may be extracted by reflection off tilted facets as described in U.S. Pat. No. 9,519,153, which is incorporated by reference herein in its entirety.

In a known privacy display the privacy mode is provided by the addition of a removable louver film, such as marketed by 3M Corporation, which may not be fitted or removed by users reliably and therefore in practice, is not assiduously attached by the user every time they are outside the office. In another known privacy display the control of privacy mode is electronically activated but control is vested in the user who must execute a keystroke to enter privacy mode.

BRIEF SUMMARY

According to a first aspect of the present disclosure, there is provided a privacy display apparatus comprising: a display device arranged to display an image, the display device being capable of providing a privacy function in which the visibility of the image to an off-axis viewer is reduced compared to the visibility of the image to an on-axis viewer; a control system arranged to control the display device; and an ambient light sensor arranged to detect the illuminance level of ambient light, wherein the control system is arranged to control luminance of the displayed image on the basis of the detected level of the ambient light in accordance with a transfer function, and when the privacy function is provided the transfer function maintains a relationship $Y_{max} \leq Y_{upper}$, where $Y_{max}$ is the maximum output luminance of the display device and $Y_{upper}$ is given by the equation:

$$Y_{upper} = \frac{(\rho(\theta=45°)/P(\theta=45°)) \cdot I}{(10^{S_{min}} - 1) \cdot \pi}$$

where the equation for $Y_{upper}$ applies for an observation direction having a polar angle $\theta$ of 45° from the normal to the display device at at least one azimuth angle around the normal to the display device, I is the detected level of the ambient light, the units of I being the units of $Y_{max}$ multiplied by solid angle in units of steradian, $\rho(\theta=45°)$ is the reflectivity of the display device along the observation direction, $P(\theta=45°)$ is the ratio of the luminance of the display device along the observation direction to the maximum output luminance $Y_{max}$ of the display device, and $S_{min}$ has a value of 1.0 or more.

Control of the luminance of the displayed image on the basis of the detected level of the ambient light is desirable to optimise the visibility of the displayed image to an on-axis viewer. By performing such control in accordance with a transfer function that maintains the relationship $Y_{max} \leq Y_{upper}$ when the privacy function is provided, the visual security level of operation of the display device may be maintained at or below the limit $S_{min}$ in the observation direction even as the illuminance level of ambient light and the luminance of the display device are varied. By maintaining the visual security level at or below the limit $S_{min}$, an off-axis viewer in that observation direction cannot in practical terms perceive the displayed image.

Advantageously, $S_{min}$ may have a value of 1.5 or more. Such an increased limit of $S_{min}$ achieves a higher level of visual security in which the image in invisible to an off-axis viewer, i.e. the viewer cannot perceive even that an image is being displayed, for most images and most observers.

Advantageously, $S_{min}$ may have a value of 1.8 or more. Such an increased limit of $S_{min}$ achieves a higher level of visual security in which the image is invisible independent of image content for all observers.

Where the display device has a major axis and a minor axis of symmetry, the equation for $Y_{max}$ may apply for an observation direction having a polar angle $\theta$ of 45° from the normal to the display device at an azimuth angle corresponding to either or both of the major axes in order to achieve the advantages with respect to an off-axis viewer with use of the display device in a landscape orientation, or the minor axis in order to achieve the advantages with respect to an off-axis viewer with use of the display device in a portrait orientation.

Advantageously, the control system may be arranged to control luminance of the displayed image when the privacy function is provided on the basis of the detected level of the ambient light in accordance with a transfer function that maintains a relationship $Y_{max} \geq Y_{lower}$, where $Y_{lower}$ is given by the equation $$Y_{lower} = \frac{(\rho(\Delta\theta=10°)/P(\Delta\theta=10°)) \cdot I}{(10^{S_{max}} - 1) \cdot \pi}$$

where the equation for $Y_{lower}$ applies for an observation direction having a polar angle $\theta$ of 10° from the direction of the maximum output luminance of the display device at at least one azimuth angle around the direction of the maximum output luminance of the display device, $\rho(\Delta\theta=10°)$ is the reflectivity of the display device along the observation direction having a polar angle $\theta$ of 10° from the direction of the maximum output luminance of the display device,)

$P(\Delta\theta=10°)$ is the ratio of the luminance of the display device along the observation direction having a polar angle θ of 10° from the direction of the maximum output luminance of the display device to the maximum output luminance $Y_{max}$ of the display device, and $S_{max}$ has a value of 0.1 or less.

By further controlling the luminance of the displayed image when the privacy function is provided in accordance with a transfer function that maintains a relationship $Y_{max} \geq Y_{lower}$, the visibility of the displayed image to an on-axis viewer is maintained.

In some cases, the ambient light sensor may detect the illuminance level of ambient light incident on the display device in a non-directional manner. In such cases, the detected level I represents an average level, so that the effect of the present technique is achieved for off-axis viewers in varied locations.

In other cases, the ambient light sensor may detect the illuminance level of ambient light incident on the display device along an incident direction for reflection to the observation direction. In such cases, the effect of the present technique may be optimised specifically for an off-axis viewer in the observation direction.

The display device may be capable of operating in at least a public mode and a privacy mode, wherein in the privacy mode the privacy function is provided and the visibility of the image to an off-axis viewer is reduced compared to the public mode, the control system being capable of selectively operating the display device in the public mode or the privacy mode for at least one region of the display device. This provides for selective operation in the public mode or the privacy mode depending on the usage of the display device. By way of example, the privacy mode can be used in public places such as cafes or trains in order to enable the primary user to keep working but preventing onlookers or snoopers from being able to see or photograph data from the screen and the public mode can be used when discussing the contents on the screen with colleagues, for example within the corporate office.

The control system may be arranged to selectively operate the display device in the public mode or the privacy mode in response to the detected level of the ambient light.

In cases where the display device comprises a backlight and a transmissive spatial light modulator arranged to receive light from the backlight, the control system may be arranged to control luminance of the displayed image by controlling the luminance of the backlight and/or by controlling transmission of light by the spatial light modulator.

In cases where the display device comprises an emissive spatial light modulator, the control system may be arranged to control luminance of the displayed image by controlling of emission of light by the spatial light modulator.

According to a second aspect of the present disclosure, there is provided a display apparatus comprising: a display device arranged to display an image and capable of operating in at least a public mode and a privacy mode, wherein the visibility of the image to an off-axis viewer is reduced in the privacy mode compared to the public mode; and the visibility of the image on-axis is maintained in the privacy mode; and a control system arranged to control the display device, the control system being capable of selectively operating the display device in the public mode or the privacy mode comprise an ambient light sensor arranged to detect the level of the ambient light.

The privacy mode can be used in public places such as cafes or trains in order to enable the primary user to keep working but preventing onlookers or snoopers from being able to see or photograph data from the screen. The public mode can be used when discussing the contents on the screen with colleagues, for example within the corporate office.

Advantageously the operation of the privacy mode may be independent of user preference such that organisations may be provided with control of exposure of private data when used in a public place without the consent of the user.

The control system may be arranged to selectively operate the display device in the public mode or the privacy mode in response to the detected level of the ambient light.

The control system may be arranged to selectively control any one or more of luminance, contrast, white point and spatial frequency of the image in the privacy mode in response to the detected level of the ambient light. The control system may be arranged to selectively control any one or more of luminance, contrast, white point and spatial frequency of the image in the public mode in response to the detected level of the ambient light. Advantageously the visual security level of operation of the display may be optimised for the illuminated environment. Further image appearance to the primary user during privacy display operation may be increased in response to the type of private image displayed.

The control system may be arranged to selectively control the display device to display information representing the visibility of the image to an off-axis viewer taking into account the detected level of the ambient light. Advantageously a display user may be provided with information regarding the visual security of the environment to achieve reliable decision making to view confidential data.

The control system may be arranged to control the display device to display information representing changes to user-controllable parameters capable of reducing the visibility of the image to an off-axis viewer. Advantageously the visual security level may be reduced while achieving comfortable viewing of image data for a primary user that is dependent on the user preference of image viewing.

The control system may be arranged to selectively control luminance of the displayed image in the public mode and the privacy mode in response to the detected level of the ambient light, using different transfer functions relating levels of luminance to detected levels of the ambient light in the public mode and in the privacy mode.

The transfer function in the public mode may relate higher levels of luminance to detected levels of the ambient light than the transfer function in the privacy mode. Advantageously a high visual security level may be provided in privacy mode to snoopers for a wide range of ambient light conditions and a high image visibility may be provided in public mode to users for a wide range of ambient light conditions.

The control system may be arranged to selectively control luminance of the displayed image in the privacy mode in response to the detected level of the ambient light, in accordance with a transfer function that maintains a relationship $Y_{max}/I \geq 1$ lux/nit, where $Y_{max}$ is the maximum output luminance of the display device measured in nits and I is the detected ambient light level measured in lux. Advantageously high visual security level is observed for varying ambient light levels and desirable image visibility is provided to the display user.

The control system may be arranged to selectively control luminance of the displayed image in the privacy mode in response to the detected level of the ambient light, in accordance with a transfer function that maintains a relationship $Y_{max} \leq Y_{lim}$, where $Y_{lim}$ is given by the equation:

$$Y_{lim} = \frac{R\theta + V_{lim} * K\theta}{(V_{lim} - 1) * P\theta}$$

where $V_{lim}$ has a value of 10, $R\theta$ is the reflected ambient illuminance at an observation angle θ of 45 degrees laterally and zero degrees in elevation from the normal to the display device, $K\theta$ is the display black state luminance at the observation angle, and $P\theta$ is the relative luminance at the observation angle θ compared to the maximum display output luminance $Y_{max}$.

The control system may be arranged to control the display device to display information representing the visibility of the image to an off-axis viewer. Advantageously the visual security level of the display device may be optimised.

In this document, public and privacy refer to the mode of the display rather than the nature of the location. For example privacy (display) mode is typically selected in public places such as coffee shops and public (display) mode is typically selected in private location such as at home.

Any of the aspects of the present disclosure may be applied in any combination.

Embodiments of the present disclosure may be used in a variety of optical systems. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in optical systems, devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1:
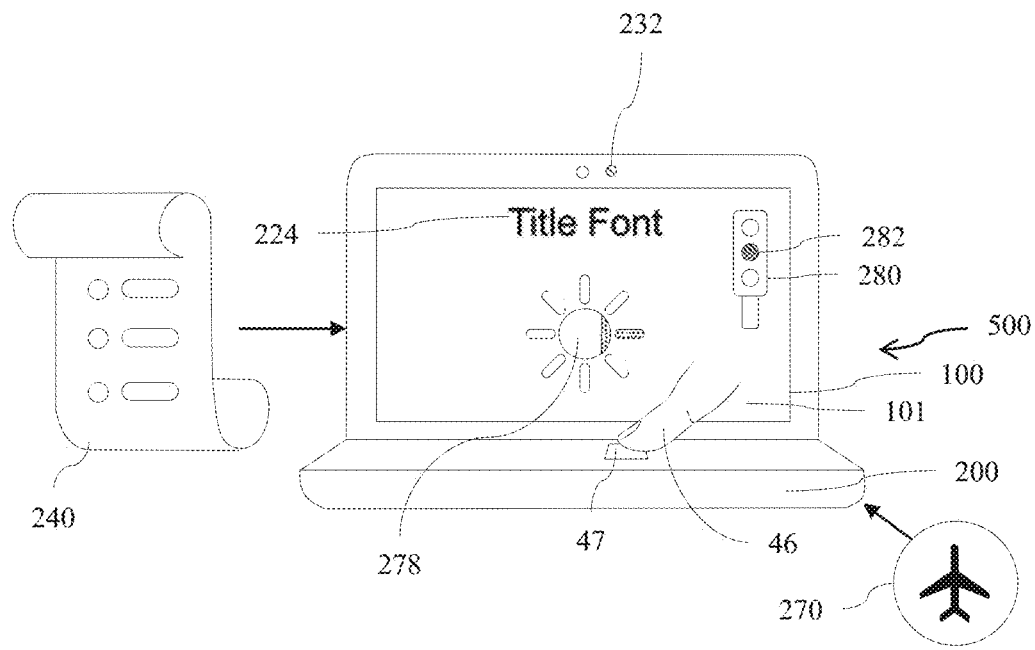
FIG. 1 is a schematic diagram illustrating a front view of a privacy display comprising a privacy control system operating in privacy mode with a first visual security level.

Terms related to privacy display appearance will now be described.

A private mode of operation of a display is one in which an observer sees a low contrast sensitivity such that an image is not clearly visible. Contrast sensitivity is a measure of the ability to discriminate between luminances of different levels in a static image. Inverse contrast sensitivity may be used as a measure of visual security, in that a high visual security level (VSL) corresponds to low image visibility.

For a privacy display providing an image to an observer, visual security may be given as:

$$V=(Y+R)/(Y-K) \qquad \text{eqn. 1}$$

where V is the visual security level (VSL), Y is the luminance of the white state of the display at a snooper viewing angle, K is the luminance of the black state of the display at the snooper viewing angle and R is the luminance of reflected light from the display.

Panel contrast ratio is given as:

$$C=Y/K \qquad \text{eqn. 2}$$

so the visual security level may be further given as:

$$V=(P.Y_{max}+I.\rho/\pi)/(P.(Y_{max}-Y_{max}/C)) \qquad \text{eqn. 3}$$

where: $Y_{max}$ is the maximum luminance of the display; P is the off-axis relative luminance typically defined as the ratio of luminance at the snooper angle to the maximum luminance $Y_{max}$; C is the image contrast ratio; ρ is the surface reflectivity; and I is the illuminance. The units of $Y_{max}$ are the units of I divided by solid angle in units of steradian.

The luminance of a display varies with angle and so the maximum luminance of the display $Y_{max}$ occurs at a particular angle that depends on the configuration of the display.

In many displays, the maximum luminance $Y_{max}$ occurs head-on, i.e. normal to the display. Any display device disclosed herein may be arranged to have a maximum luminance $Y_{max}$ that occurs head-on, in which case references to the maximum luminance of the display device $Y_{max}$ may be replaced by references to the luminance normal to the display device.

Alternatively, any display described herein may be arranged to have a maximum luminance $Y_{max}$ that occurs at a polar angle to the normal to the display device that is greater than 0°. By way of example, the maximum luminance $Y_{max}$ may occur at a non-zero polar angle and at an azimuth angle that has for example zero lateral angle so that the maximum luminance is for an on-axis user that is looking down on to the display device. The polar angle may for example be 10 degrees and the azimuthal angle may be the northerly direction (90 degrees anti-clockwise from easterly direction). The viewer may therefore desirably see a high luminance at typical non-normal viewing angles.

The off-axis relative luminance, P is sometimes referred to as the privacy level. However, such privacy level P describes relative luminance of a display at a given polar angle compared to head-on luminance, and in fact is not a measure of privacy appearance.

The illuminance, I is the luminous flux per unit area that is incident on the display and reflected from the display towards the observer location. For Lambertian illuminance, and for displays with a Lambertian front diffuser illuminance I is invariant with polar and azimuthal angles. For arrangements with a display with non-Lambertian front diffusion arranged in an environment with directional (non-Lambertian) ambient light, illuminance I varies with polar and azimuthal angle of observation.

Thus in a perfectly dark environment, a high contrast display has VSL of approximately 1.0. As ambient illuminance increases, the perceived image contrast degrades, VSL increases and a private image is perceived.

For typical liquid crystal displays the panel contrast C is above 100:1 for almost all viewing angles. allowing the visual security level to be approximated to:

$$V=1+I.\rho/(\pi.P.Y_{max})$$ eqn. 4

In the present embodiments, in addition to the exemplary definition of eqn. 4, other measurements of visual security level, V may be provided, for example to include the effect on image visibility to a snooper of snooper location, image contrast, image colour and white point and subtended image feature size. Thus the visual security level may be a measure of the degree of privacy of the display but may not be restricted to the parameter V.

The perceptual image security may be determined from the logarithmic response of the eye, such that $$S=log_{10}(V)$$ eqn. 5

Desirable limits for S were determined in the following manner. In a first step a privacy display device was provided. Measurements of the variation of privacy level, P(θ) of the display device with polar viewing angle and variation of reflectivity ρ(θ) of the display device with polar viewing angle were made using photopic measurement equipment. A light source such as a substantially uniform luminance light box was arranged to provide illumination from an illuminated region that was arranged to illuminate the privacy display device along an incident direction for reflection to a viewer positions at a polar angle of greater than 0° to the normal to the display device. The variation I(θ) of illuminance of a substantially Lambertian emitting lightbox with polar viewing angle was determined by and measuring the variation of recorded reflective luminance with polar viewing angle taking into account the variation of reflectivity ρ(θ). The measurements of P(θ), r(θ) and I(θ) were used to determine the variation of Security Factor S(θ) with polar viewing angle along the zero elevation-axis.

In a second step a series of high contrast images were provided on the privacy display including (i) small text images with maximum font height 3 mm, (ii) large text images with maximum font height 30 mm and (iii) moving images.

In a third step each observer (with eyesight correction for viewing at 1000 mm where appropriate) viewed each of the images from a distance of 1000 m, and adjusted their polar angle of viewing at zero elevation until image invisibility was achieved for one eye from a position near on the display at or close to the centre-line of the display. The polar location of the observer's eye was recorded. From the relationship S(θ), the security factor at said polar location was determined. The measurement was repeated for the different images, for various display luminance $Y_{max}$, different lightbox illuminance I(θ=0), for different background lighting conditions and for different observers.

From the above measurements S<1.0 (V<10) provides low or no visual security, 1.0≤S<1.5 (10≤V<32) provides visual security that is dependent on the contrast, spatial frequency and temporal frequency of image content, 1.5≤S<1.8 (32≤V<63) provides acceptable image invisibility (that is no image contrast is observable) for most images and most observers and S≥1.8 (V≥63) provides full image invisibility, independent of image content for all observers.

In practical display devices, this means that it is desirable to provide a value of S for an off-axis viewer who is a snooper that meets the relationship S≥$S_{min}$, where: $S_{min}$ has a value of 1.0 or more to achieve the effect that the off-axis viewer cannot perceive the displayed image; $S_{min}$ has a value of 1.5 or more to achieve the effect that the displayed image is invisible, i.e. the viewer cannot perceive even that an image is being displayed, for most images and most observers; or $S_{min}$ has a value of 1.8 or more to achieve the effect that the displayed image is invisible independent of image content for all observers.

In comparison to privacy displays, desirably wide angle displays are easily observed in standard ambient illuminance conditions. One measure of image visibility is given by the contrast sensitivity such as the Michelson contrast which is given by:

$$M=(I_{max}-I_{min})/(I_{max}+I_{min})$$ eqn. 6 and so:

$$M=((Y+R)-(K+R))/((Y+R)+(K+R))=(Y-K)/(Y+K+2.R)$$ eqn. 7

Thus the visual security level (VSL), V is equivalent (but not identical to) 1/M. In the present discussion, for a given off-axis relative luminance, P the wide angle image visibility, W is approximated as $$W=1/V=1/(1+I.\rho/(\pi.P.Y_{max}))$$ eqn. 8

The above discussion focusses on reducing visibility of the displayed image to an off-axis viewer who is a snooper, but similar considerations apply to visibility of the displayed image to the intended user of the display device who is typically on-axis. In this case, decrease of the level of the visual security level (VSL) V corresponds to an increase in the visibility of the image to the viewer. During observation S≤0.1 (V≤1.25, W≥0.8) may provide acceptable visibility of the displayed image. In practical display devices, this means that it is desirable to provide a value of S for an on-axis viewer who is the intended user of the display device that meets the relationship S≤$S_{max}$, where $S_{max}$ has a value of 0.1.

It would be desirable to provide control of a switchable privacy display.

FIG. 1 is a schematic diagram illustrating a front view of a privacy display apparatus 200 comprising a privacy display device 100 that is controlled by a privacy control system 500 operating in privacy mode with a first visual security level. The display device 100 displays an image.

Display apparatus 200 may comprise privacy mode capable display device 100 and control system 500. The display device 100 is arranged to display an image and capable of operating in at least a public mode and a privacy mode, wherein in the privacy mode the privacy function is provided and the visibility of the image to an off-axis viewer is reduced compared to the public mode and the visibility of the image to the primary user in an on-axis position remains visible in both the privacy and public modes. The control system 500 selectively operates the display device 100 in the public mode or the privacy mode for at least one region of the displayed image, typically the entire displayed image.

The display device 100 may in general provide the privacy function in any way. Examples of suitable types of display device for use as the display device 100 are described further below.

Means to determine privacy mode operation will now be described.

For a head-on user in typical ambient illuminance environments, desirably the display device 100 provides a displayed image 101 that has a luminance to achieve high image visibility, W in both privacy and public modes of operation.

The display apparatus 200 may also comprise inputs related to desirable circumstances to provide privacy images, or conversely by undesirable circumstances to provide public images. Such desirable and undesirable circumstances may be determined by policy 240 that is provided for example by a corporate policy, government policy, medical ethical policy or by user preference settings.

The control system 500 may be arranged to selectively operate the display device 100 in the public mode or the privacy mode in response to the detected level of the ambient light. The display apparatus 200 has an ambient light sensor 232 that detected the illuminance level of ambient light. The ambient light sensor 232 may be of any suitable type, such as a photodiode which may have a photopic filter or a photopic light response current or voltage or digital value.

Some types of display have multiple optical effects to improve privacy performance, with exemplary optical effects described below. If more than one privacy optical effect is available, the mode that gives the widest viewing freedom for the primary user while still maintaining adequate visual security level at the ambient light level experienced can be selected by the control system 500. Advantageously privacy is protected, and user productivity is maintained.

Airplane mode 270 may be selected, indicating that low light level ambient environments may be present and visual security level control adapted accordingly.

Advantageously in public mode the display device 100 may have greater image uniformity and viewing freedom for the primary user as well as being visible from multiple viewing locations.

Visual security level indicator 280 may be provided on the display which is a measure of the privacy level achieved. In the illustrative example of FIG. 1, the indicator 282 may be an amber privacy warning that indicates there may be some residual image visibility to an off-axis snooper. When switched in to privacy mode the control system 500 may be arranged to control the display device 100 to display image 101 with information such as indicator 280 representing the visibility of the image to an off-axis viewer, for example to provide visual security level, V. Advantageously the user or their supervisor may be confident in the privacy level being achieved in the specific environment in which they are operating.

The display appearance in privacy mode as seen by a snooper will now be described together with further inputs for the control of visual security level.

Figure 2:
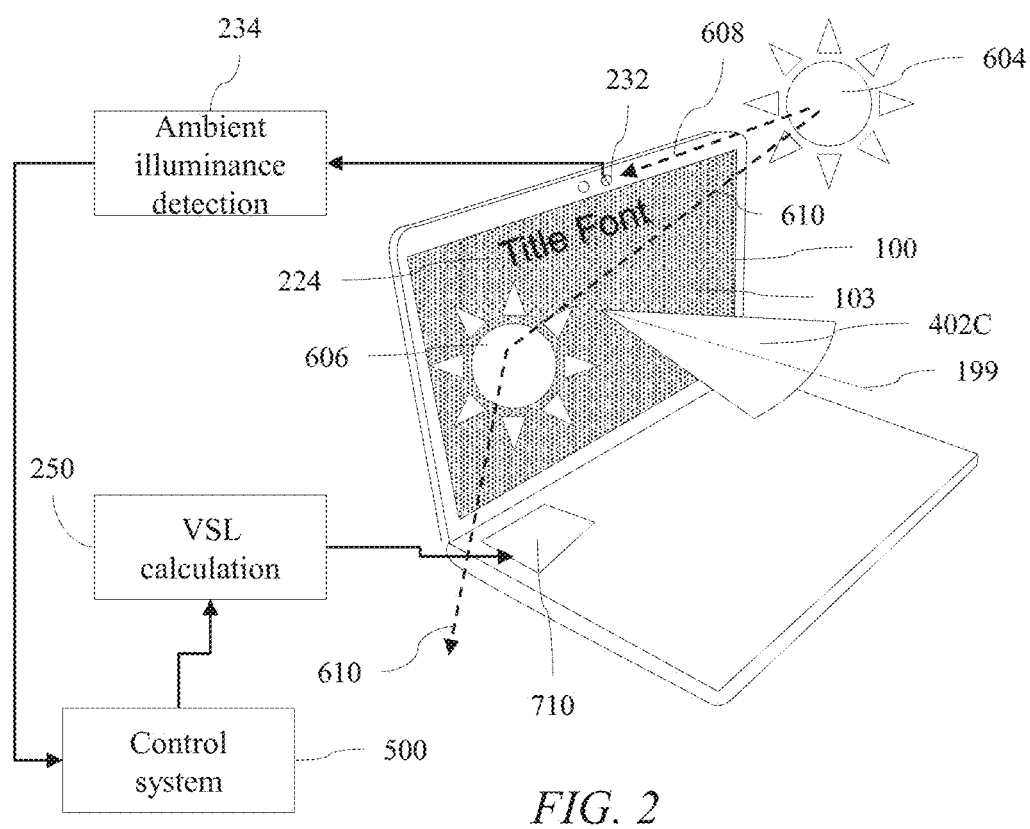
FIG. 2 is a schematic diagram illustrating a look-down perspective of a privacy display comprising a privacy control system operating in privacy mode with a first visual security level.

FIG. 2 is a schematic diagram illustrating a look-down perspective of a privacy display comprising a privacy control system 500 operating in privacy mode with a first visual security level.

As will be described below, off-axis privacy may be provided by control of off-axis luminance, reflectivity and image contrast of the image 103 provided by a switchable privacy display device 100 to an undesirable snooper.

In one example, the display apparatus may comprise an emissive spatial light modulator. In this case, the privacy control system 500 may control luminance of the displayed image by controlling of emission of light by the spatial light modulator.

In another example, the display device may comprise a backlight and a transmissive spatial light modulator arranged to receive light from the backlight. In this case, the control system may be arranged to control luminance of the displayed image by controlling the luminance of the backlight and/or by controlling transmission of light by the spatial light modulator.

In operation in privacy mode, a limited output cone angle 402C that is typically centred on the optical axis 199 that is typically a surface normal to the display device 100 is provided.

Off-axis luminance is reduced. Ambient light sources 604 illuminate the display surface with light rays 610. Reflected light 606 from the display provides increased visual security level, V as described above.

Some light rays 608 may be incident on Ambient Light Sensor, ALS 232. The ALS 232 may be a separate element or may be incorporated in the camera 230 detection system.

Ambient illuminance detection 234 provides a calculation of ambient illuminance and is input into the control system 500. VSL calculation 250 is used to determine desirable display setting characteristics and output to display control 710. The display control 710 may control display luminance setting 278 and may be further used to provide visual security level indicator 280 level 282. Display control 710 is further described below in relation to an example of a privacy display.

Features of the embodiment of FIG. 2 not discussed in further detail may be assumed to correspond to the features with equivalent reference numerals as discussed above, including any potential variations in the features.

Figure 13:
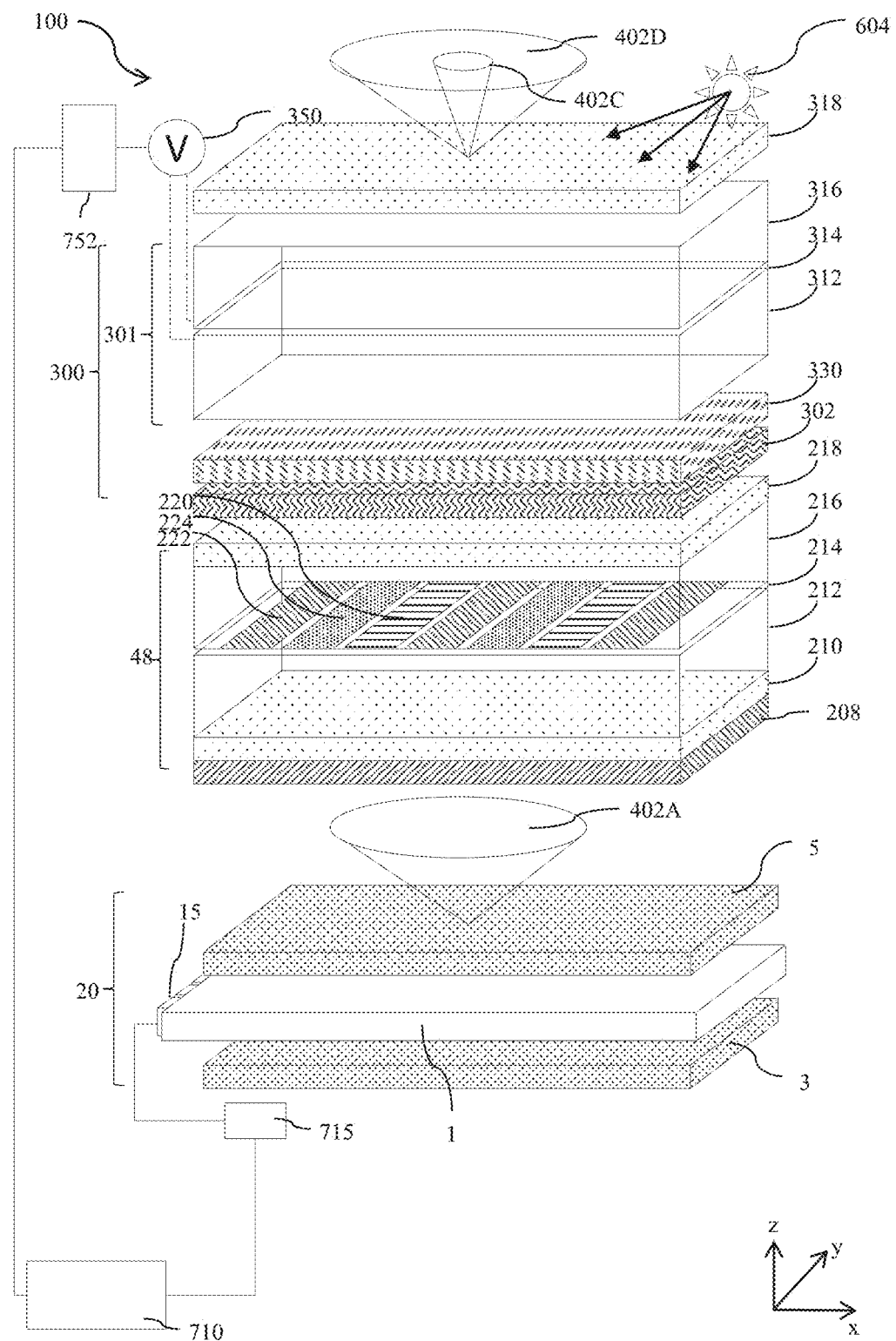
FIG. 13 is a schematic diagram illustrating in front perspective view a switchable directional display device comprising a directional backlight and a switchable liquid crystal retarder.

In public display mode, a larger solid angle output light cone 402D as illustrated in FIG. 13 may be provided from the switchable privacy display device 100 may be adjusted to be larger than in privacy mode, such that off-axis display luminance is increased.

Visual security level indicator 280 may be provided on the display which is a measure of the privacy level achieved.

Switching between exemplary privacy and public luminance profiles will now be described.

Figure 3:
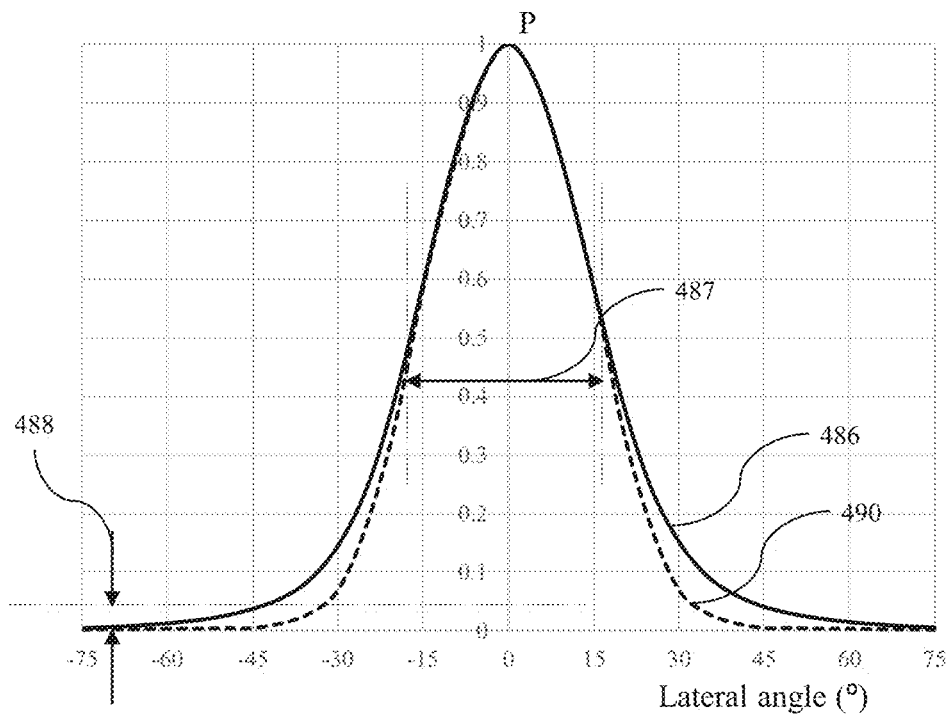
FIG. 3 is a schematic graph illustrating variation of output luminance with viewing angle for a typical collimated backlight arranged to cooperate with a switchable retarder to provide high visual security level to a wide range of snooper locations.

FIG. 3 is a schematic graph illustrating variation of output luminance with viewing angle for a typical collimated backlight arranged to cooperate with plural retarders 300 to provide high visual security level to a wide range of snooper locations. Features of the embodiment of FIG. 3 not discussed in further detail may be assumed to correspond to the features with equivalent reference numerals as discussed above, including any potential variations in the features.

FIG. 3 illustrates a desirable luminance profile 486 of a backlight 20 operated in privacy mode for use with the switchable liquid crystal retarder 300 of FIG. 13 in privacy mode. The profile 486 is modified by switchable liquid crystal retarder 300 to provide an illustrative profile 490 that advantageously achieves an off-axis relative luminance of less than 0.5% at 45 degrees lateral angle and zero degrees elevation.

Control of visual security level will now be further described.

Figure 4:
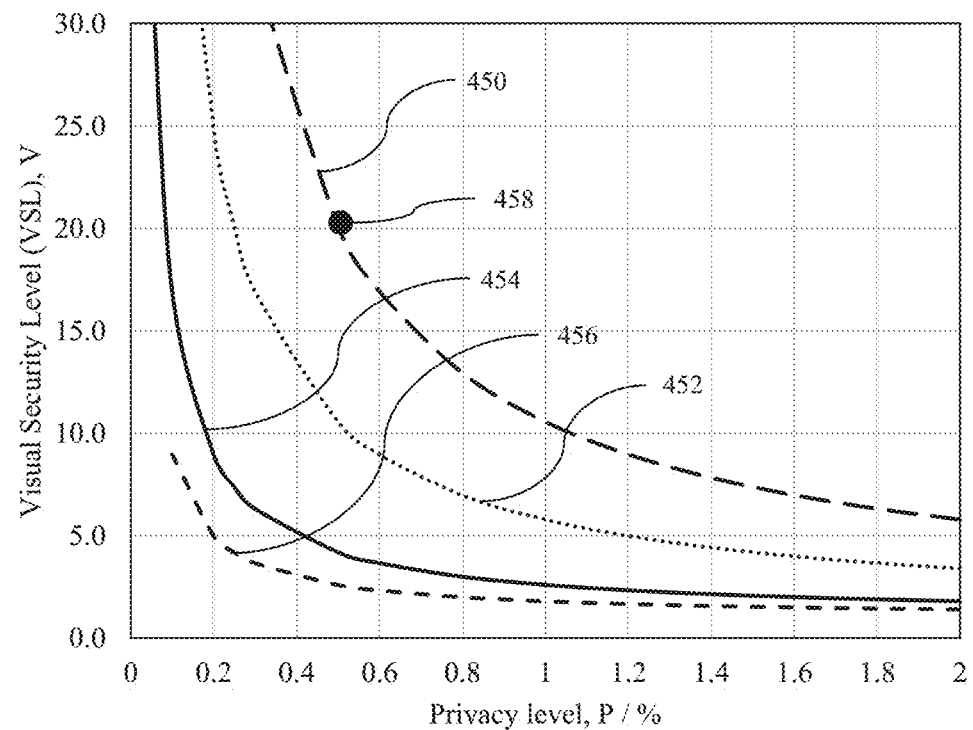
FIG. 4 is a schematic graph illustrating variation of visual security level with off-axis relative luminance of a switchable privacy display operating in privacy mode.

FIG. 4 is a schematic graph illustrating variation of visual security level with off-axis relative luminance of a switchable privacy display operating in privacy mode and with reference to the privacy displays of FIG. 13, as exemplary embodiments of a switchable privacy display 100. Features of the embodiment of FIG. 4 not discussed in further detail may be assumed to correspond to the features with equivalent reference numerals as discussed above, including any potential variations in the features.

FIG. 4 illustrates the profiles of visual security level, V (calculated in each illustrative embodiment from eqn. 4, above) and with the illustrative embodiments as illustrated in TABLE 1 for varying privacy levels achieved at the target snooper viewing locations 26L, 26R. Display reflectivity of 30% or more may be achieved for displays comprising reflective polariser 302, while display reflectivity of approximately 5% may be achieved for displays not comprising reflective polariser 302.

TABLE 1

| Profile | Display reflectivity, ρ (%) | Ambient illuminance, I (lux) | Head-on luminance, $Y_{max}$ (nits) | Visual Security Level, V @ 45° lateral angle, 458 | Perceptual Image Security, S |
|---|---|---|---|---|---|
| — | 30 | 500 | 200 | 48.7 | 1.69 |
| — | 30 | 500 | 300 | 32.8 | 1.52 |
| 450 | 30 | 300 | 300 | 20.1 | 1.30 |
| 452 | 30 | 150 | 300 | 10.5 | 1.02 |
| — | 5 | 500 | 100 | 16.9 | 1.23 |
| — | 5 | 500 | 200 | 9.0 | 0.95 |
| 454 | 5 | 300 | 300 | 4.2 | 0.62 |
| 456 | 5 | 150 | 300 | 2.6 | 0.41 |

At 0.5% privacy level, various visual security level points 458 may be provided depending on display structure, ambient illuminance and display luminance. The present embodiments further provide indicator 280 for display of visual security level that may be provided for example by means of traffic light indicators.

The variation of display reflectivity with viewing angle will now be described.

Figure 5:
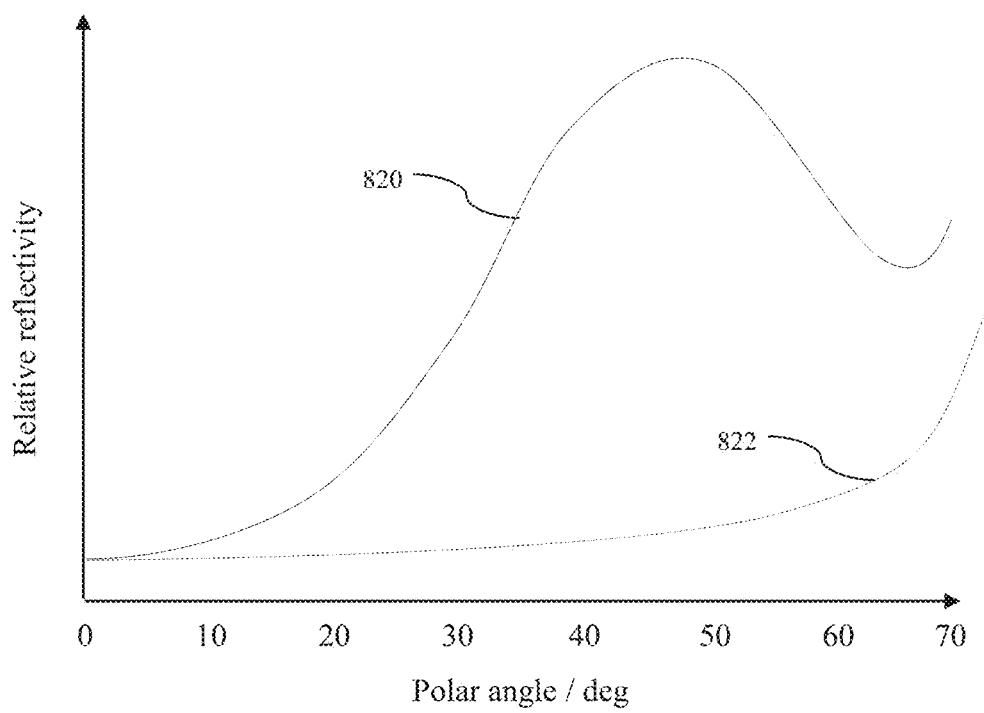
FIG. 5 is a schematic graph illustrating variation of reflectivity with polar viewing angle for two types of privacy display.

FIG. 5 is a schematic graph illustrating variation of reflectivity with polar viewing angle (that may be the lateral angle for zero elevation) for two types of privacy display. Profile 820 illustrates the variation of reflectivity for an illustrative embodiment of FIG. 13 and profile 822 illustrates the variation of reflectivity for an embodiment without the reflective polariser 302 of FIG. 13. Both profiles include Fresnel reflectivity at the outer polariser 318 and thus increase at high polar angles.

The variation of visual security level, V with viewing angle will now be described.

Figure 6:
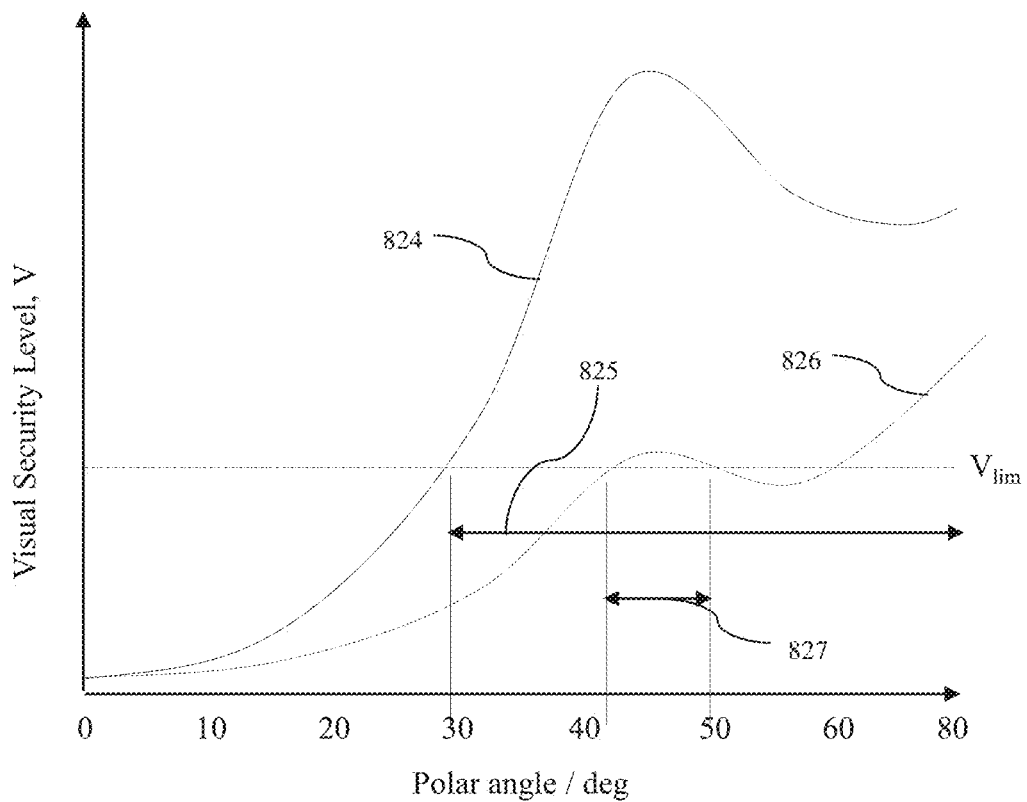
FIG. 6 is a schematic graph illustrating variation of visual security level with polar viewing angle for the two types of privacy display of FIG. 5.

FIG. 6 is a schematic graph illustrating variation of visual security level with polar viewing angle for the two types of privacy display of FIG. 5. VSL profile 824 illustrates an output for a display of the type of FIG. 13 with reflective polariser 302, and VSL profile 826 illustrates an output for the display of FIG. 13 with the reflective polariser 302 omitted. VSL profiles are illustrated for the same ambient illuminance, I. The limit $V_{lim}$ above which no image visibility is present is described further below. The angular range 825 of snooper locations for the profile 824 is thus greater than the angular range 827 for the profile 826. The reflective polariser 302 achieves above threshold visual security level over a wider polar range, advantageously achieving increased protection from snoopers. Further, head-on luminance may be increased for a given ambient illuminance, increasing image visibility for the display user.

Selective control of the relationship between desirable display luminance and ambient light illuminance will now be described.

The control system 500 controls luminance of the displayed image on the basis of the detected level of the ambient light in accordance with a transfer function. The transfer function may be selected to optimise the visibility of the displayed image to an on-axis viewer. Similar techniques for optimisation of the visibility of a displayed image on the basis of the detected level of ambient light are commonly used for display devices for portable devices such as a mobile telephone and may be applied here. However, the transfer function may be adapted for use with the privacy display device 100 when a privacy function is provided, as follows.

Typically, the transfer function provides higher luminance of the displayed image in the public mode than in the privacy mode. Some illustrative examples will now be described.

Figure 7A:
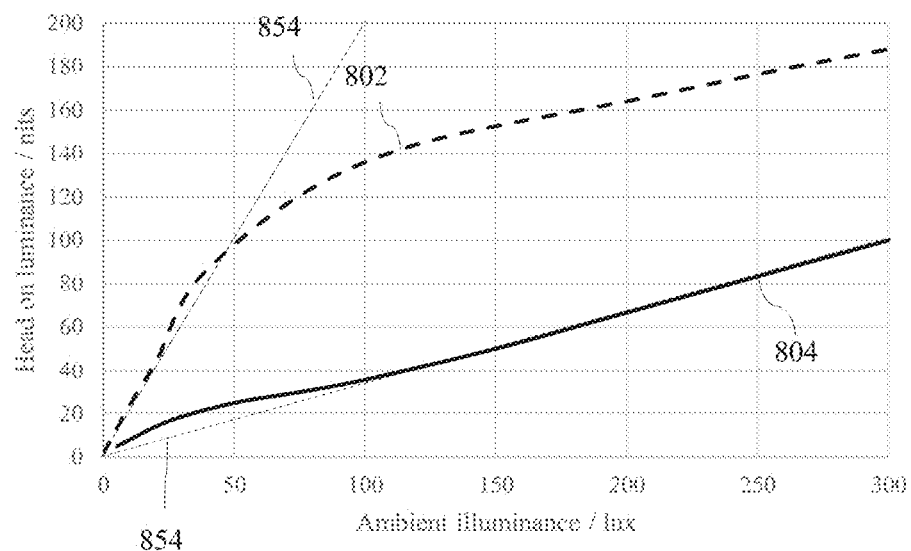
FIG. 7A is a schematic graph illustrating transfer functions between head-on display luminance and ambient illuminance.
Figure 7B:
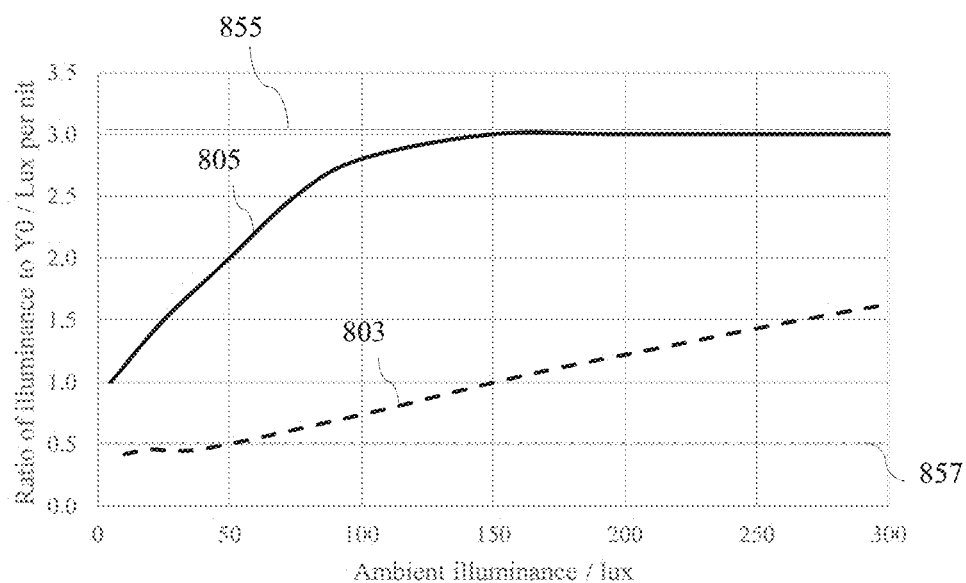
FIG. 7B is a schematic graph illustrating transfer functions between the ratio of measured ambient illuminance to head-on display luminance and ambient illuminance.

FIG. 7A is a schematic diagram illustrating transfer function profiles 802, 804, 852, 854 between display head-on luminance measured in nits and detected ambient illuminance measured in lux; and FIG. 7B is a schematic graph illustrating transfer function profiles 803, 805, 853, 857 between the ratio of measured ambient illuminance to head-on display luminance measured in lux per nit and ambient illuminance measured in lux.

The control system 500 is arranged to selectively control luminance of the displayed image in the public mode and the privacy mode in response to the detected level of the ambient light, in accordance with different transfer functions 802, 804, 852, 854, 856 relating levels of luminance to detected levels of the ambient light in the public mode and in the privacy mode respectively.

Considering profile 856 of FIG. 7A and corresponding profile 857 of FIG. 7B, a linear variation of display luminance Y0 is provided compared to measured ambient illuminance with a constant ratio of 0.5 lux/nit for all illuminance levels. In operation, such a display has high luminance compared to background illuminance over all illuminance ranges.

Profiles 802, 803 differ from profiles 856, 857 by increasing the lux/nit ratio with increasing luminance. Advantageously such profiles achieve visually comfortable images with high image visibility and low perceived glare over a wide illuminance range.

In a switchable privacy display such as that described hereinbelow with respect to FIG. 13, such profiles 856, 857 and 802, 803 may be desirable for a public mode of operation. The profiles 856, 857, 802, 803 advantageously achieve high image visibility, (W≥0.8 desirably) and low image security factor, (S≤0.1 desirably) for on-axis and off-axis viewing locations over a wide polar region as will be described further hereinbelow.

Considering profile 854 of FIG. 7A and corresponding profile 855 of FIG. 7B, a linear variation of display luminance Y0 is provided compared to measured ambient illuminance with a constant ratio of 3.0 lux/nit for all illuminance levels. In operation, such a display has reduced luminance compared to background illuminance over all illuminance ranges in comparison to a display with the profiles 802, 803.

Profiles 804, 805 differ from profiles 854, 855 by increasing the lux/nit ratio with increasing luminance for luminance levels below 150 nits.

In a switchable privacy display such as that described hereinbelow with respect to FIG. 13, such profiles may be desirable for a privacy mode of operation. The profiles 856, 857, 802, 803 advantageously achieve high image visibility, (W≥0.8 desirably) and low image security factor, (S≤0.1 desirably) for on-axis and off-axis viewing locations over a wide polar region as will be described further hereinbelow. Advantageously such profiles 854, 855 and 804, 805 may achieve desirable luminance and image visibility to the display user at lower illuminance levels. Further such profiles 856, 857, 802, 803 achieve increased image security at higher illuminance levels.

When operating in the privacy mode the privacy transfer function 804 is selected and the control system uses the measured ambient light level to control the display luminance so that a desirable visual security level, V at at least one off-axis snooper observation angle is provided for different ambient illumination levels. Advantageously display security may be maintained in different lighting conditions.

When operating in the public mode the public transfer function 802 may be selected to provide a desirable image visibility, W for different ambient illumination levels. Advantageously display visibility may be maintained in different lighting conditions for off-axis observers.

The variation of security factor with display control and ambient illuminance level will now be further described.

Figures 8A, 8B:
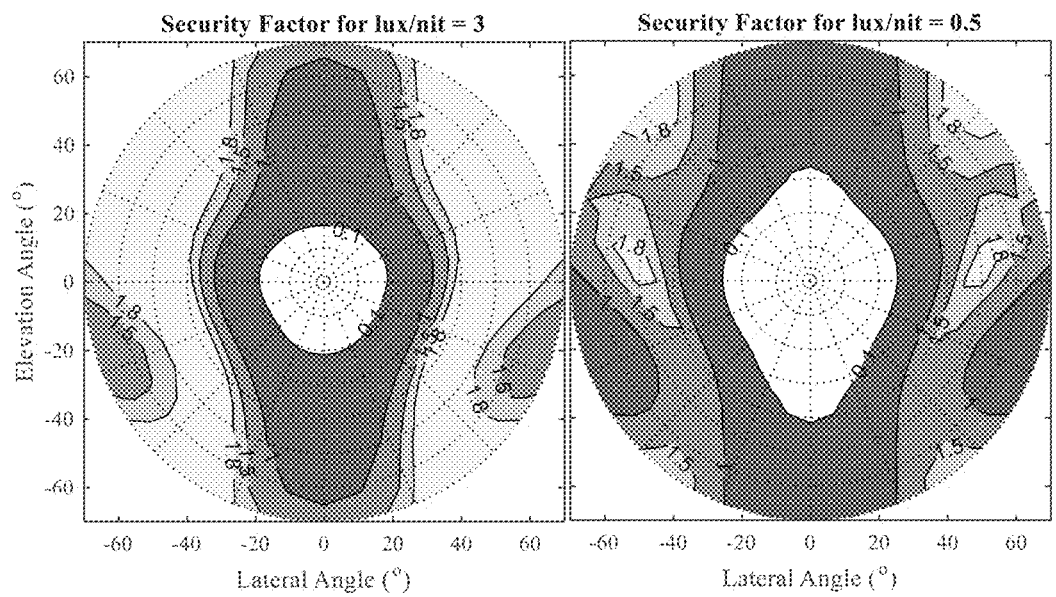
FIG. 8A is a schematic graph illustrating the variation of security factor with polar angle for an illustrative privacy display operating in privacy mode for a lux/nit ratio of 3.0.
FIG. 8B is a schematic graph illustrating the variation of security factor with polar angle for an illustrative privacy display operating in public mode for a lux/nit ratio of 0.5
Figures 8C, 8D:
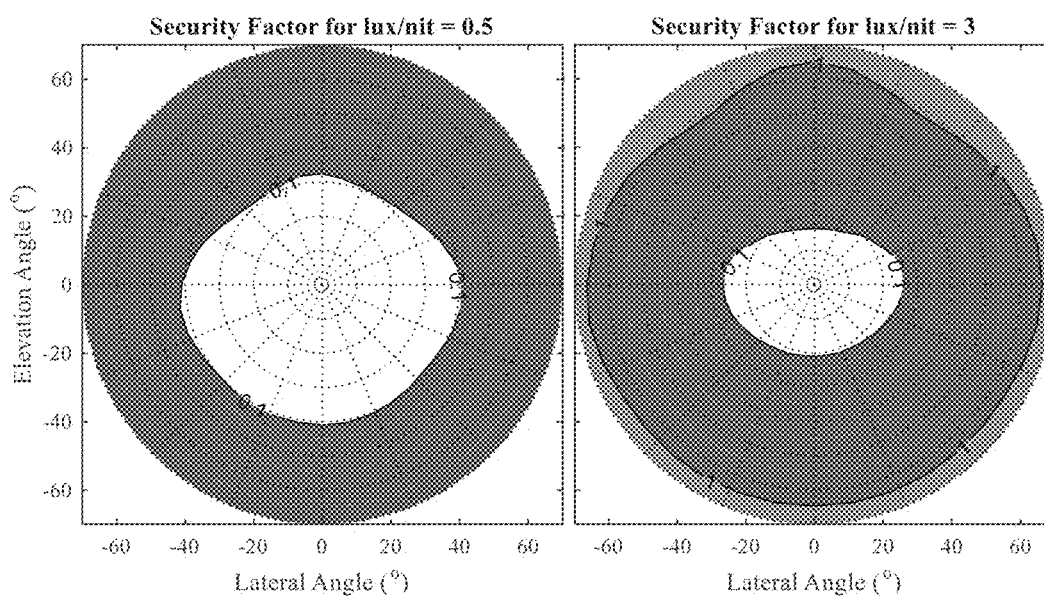
FIG. 8C is a schematic graph illustrating the variation of security factor with polar angle for an illustrative privacy display operating in public mode for a lux/nit ratio of 0.5.
FIG. 8D is a schematic graph illustrating the variation of security factor with polar angle for an illustrative privacy display operating in privacy mode for a lux/nit ratio of 3.0.

FIG. 8A is a schematic graph illustrating the variation of security factor with polar angle for an illustrative privacy display operating in privacy mode for a lux/nit ratio of 3.0; FIG. 8B is a schematic graph illustrating the variation of security factor with polar angle for an illustrative privacy display operating in privacy mode for a lux/nit ratio of 0.5; FIG. 8C is a schematic graph illustrating the variation of security factor with polar angle for an illustrative privacy display operating in public mode for a lux/nit ratio of 0.5; and FIG. 8D is a schematic graph illustrating the variation of security factor with polar angle for an illustrative privacy display operating in public mode for a lux/nit ratio of 3.0.

The profiles of FIGS. 8A-D are provided by the illustrative embodiment of FIG. 13 hereinbelow, for different ratios of illuminance to head-on luminance Y0 as will now be described. The primary display user is located in the polar region near to lateral angle 0°, elevation angle 0°. Snoopers are typically located in polar locations with lateral angles >25° and more typically in polar locations with lateral angles >35°.

In FIG. 8A, the display 100 is arranged to provide low off-axis luminance (such as illustrated in the lateral direction by profile 490 of FIG. 3), and high off-axis reflectivity (such as illustrated in the lateral direction by profile 820 of FIG. 5). The display head-on luminance Y0 is controlled by control of the light sources 15 of the backlight 20 such that the luminance Y0 measured in nits is one-third of the illuminance (that is assumed to be the same for all polar angles) measured in lux. Around the on-axis directions, S≤0.1 and an image is seen with high image visibility, W≥0.8. Advantageously the arrangement 8A is a desirable polar profile of security factor, S for privacy operation.

By way of comparison with FIG. 8A, FIG. 8B illustrates the variation of security factor, S with polar viewing angle for luminance Y0 measured in nits that is twice the illuminance measured in lux (that is the arrangement suitable for public mode viewing). Undesirably the polar region within which the security factor, S≥1.5 is substantially reduced. Off-axis display users may see more image data than for the arrangement of FIG. 8A.

In FIG. 8C, the display 100 is arranged by control of polar control retarders 300 to provide increased off-axis luminance (such as illustrated in the lateral direction by profile 486 of FIG. 3), and reduced off-axis reflectivity (such as illustrated in the lateral direction by profile 822 of FIG. 5). The display head-on luminance Y0 in nits is controlled to be three times the illuminance measured in lux. Around the on-axis directions, S≤0.1 and an image is seen with high image visibility, W≥0.8. The arrangement 8A is a desirable polar profile of security factor, S for privacy operation. Advantageously the polar region for S≤0.1 is significantly increased such that off-axis observers can see an image on the display 100 with high image visibility.

By way of comparison with FIG. 8C, FIG. 8D illustrates the variation of security factor, S with polar viewing angle for luminance Y0 measured in nits that is one-third of the illuminance measured in lux (that is the arrangement suitable for privacy viewing). Undesirably the polar region within which the security factor, S>1.5 is substantially reduced. Off-axis display users may undesirably see less image data than for the arrangement of FIG. 8C.

Advantageously the control system of the present embodiments achieves desirable performance in both privacy and public modes of operation for different illuminance levels.

It may be desirable for users, or control systems to select the transfer function to achieve desirable levels of luminance to the head-on user, to adjust the size of the polar region for head-on users in privacy mode, to adjust the size of the polar region for secure viewing by off-axis snoopers and/or to adjust the size of the polar region for public operation as will now be described.

Figure 9A:
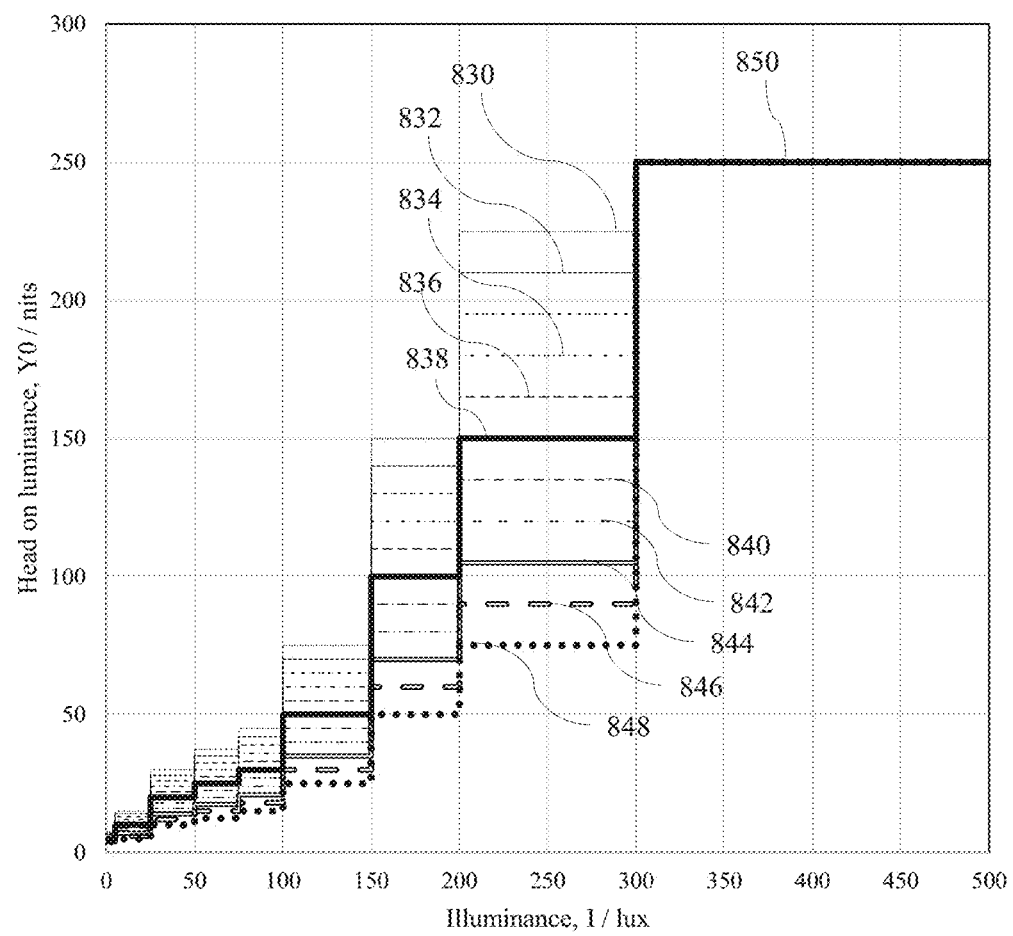
FIG. 9A is a schematic graph illustrating user selectable transfer functions between head-on display luminance and ambient illuminance.

FIG. 9A is a schematic graph illustrating user selectable transfer functions between head-on display luminance and ambient illuminance. In comparison to the arrangement of FIG. 7A, selectable profiles 830, 832, 834, 836, 838, 840, 842, 844, 846, 848 may be provided, each of which is shaped as a step function of luminance of the displayed image with increasing detected levels of the ambient light.

Advantageously, the profile control of FIG. 9A may be provided at low cost and complexity due to the step function shape of the transfer function. The control system 500 could similarly provide a single one of the profiles to achieve the same benefit.

An illustrative example of operation will now be described. The display may be operated in a bright environment such as 450 lux. In such an environment the display may default to its maximum peak luminance of 250 nits provided to the head-on user. The user may further reduce the display luminance if desirable. Advantageously high visual security may be provided for a wide range of ambient illuminance. The profiles may be selected with a step function as illustrated to reduce the number of settings and reduce driving cost by selecting a different profile. Alternatively smooth profiles that vary continuously with ambient illuminance may be provided.

In a default setting 838, when the ambient illuminance falls, for example between 250 lux and 175 lux, the display switches between 150 nits to 100 nits. Visual security level for snoopers is maintained above a threshold. A time constant may be applied to the switching of the profile so that the variation is not visible as a display flicker. The time constant may be several seconds for example.

At high illuminance levels a single display head-on luminance $Y_{max}$ may be provided for all the profiles as illustrated, or the step functions may continue to vary with luminance.

In some environments, the user may prefer a brighter head-on image, with some limited reduction of visual security and so may select profile 832 in place of the default setting. In other environments for which high visual security level is desirable, profile 848 may be selected with a lower head-on luminance and increased visual security level.

In other words, the user may change the default display brightness setting from the profile illustrated by the default profile 838 in the figure. If the ambient illuminance changes the display may follow the brightness step profile selected e.g. profile 830 as shown.

During periods in which the ambient illuminance is varying or the user selection of profile is changed, switching between the profiles may be provided over an extended time period such as several seconds to achieve seamless variation of display appearance.

Figure 9B:
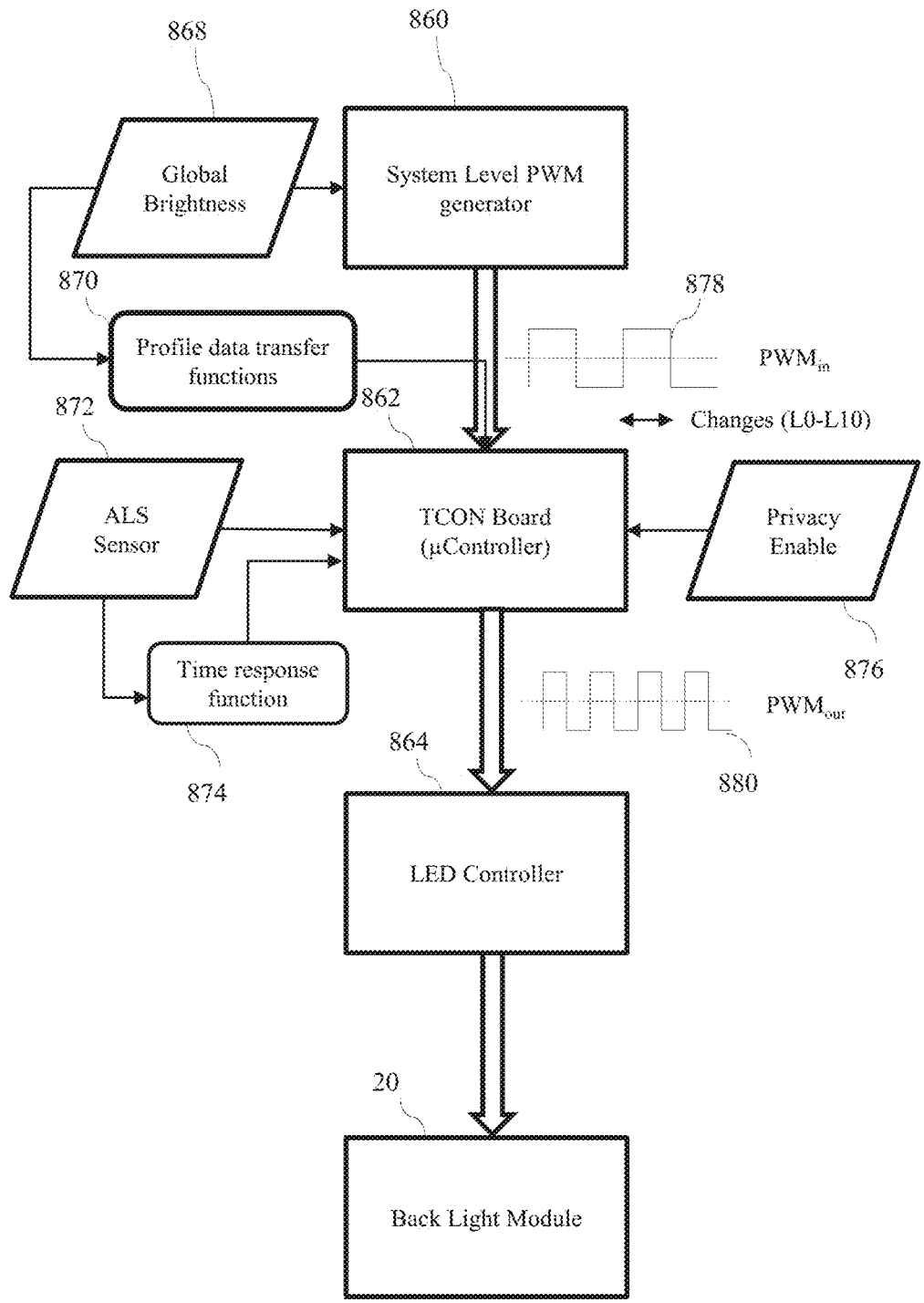
FIG. 9B is a schematic flowchart illustrating a method for operating user selectable transfer functions.

FIG. 9B is a schematic flowchart illustrating a method for operating user selectable transfer functions.

The display apparatus, for example a notebook computer, may have a system level PWM (Pulse Width Modulation) generator 860. The input to the system level PWM generator 860 may include a setting for Global Brightness 868 set by the operating system and which may use as an input the output of a separate ambient light sensor (not shown).

The input to the Global Brightness 868 settings may also include user input which may bias or adjust the default display brightness. The PWM input 878 is received by the timing controller (TCON) board 862 which may include a microcontroller to perform processing functions. The TCON board 862 also includes input from a privacy enable 876 signal which determines if the display is in privacy mode or not. If the display is not in privacy mode the PWM output 880 may follow the PWM input 878. The TCON board 862 further includes an input from an ambient light sensor ALS 872 which may be different from the ambient light sensor ALS provided by the system. In particular the ambient light sensor 872 may be provided with direct connection to the TCON 862 as illustrated. This connection may be independent of the operating system control. The PWM output 880 sent to the LED controller 864 is able to be modified by the TCON 862. A time response function 874 takes input from the ALS 872 and enables the TCON 862 to provide PWM output 880 so that changes in ambient illuminance result in a change in signal to the LED controller 864 that varies gradually over time so that the user does not experience flicker or jumps in display brightness. The time response function 874 may also suppress the effects of frequency components of ambient illumination (e.g. 50 or 60 Hz) that may result from fluorescent tubes or the like.

The LED controller 864 is connected to the LED bar 15 of the privacy display 100, which may be a PCB or a flexible PCB incorporated within the backlight 20 of the privacy display 100 as illustrated in FIG. 13, below for example. In other arrangements (not shown) the LED controller 864 may be provided by a display controller arranged to control the luminance of an emissive spatial light modulator 48 such as an emissive OLED display or emissive micro-LED display.

When the privacy function is provided in the privacy mode, the transfer function may maintain a relationship $Y_{max} \leq Y_{upper}$, where $Y_{max}$ is the maximum output luminance of the display device and $Y_{upper}$ is given by the equation:

$$Y_{upper} = \frac{(\rho(\theta = 45°)/P(\theta = 45°)) \cdot I}{(10^{S_{min}} - 1) \cdot \pi} \qquad \text{eqn. 9}$$

where the equation for $Y_{upper}$ applies for an observation direction having a polar angle θ of 45° from the normal to the display device at at least one azimuth angle around the normal to the display device, I is the detected level of the ambient light, the units of I being the units of $Y_{max}$ multiplied by solid angle in units of steradian, ρ(θ=45°) is the reflectivity of the display device along the observation direction, P(θ=45°) is the ratio of the luminance of the display device along the observation direction to the maximum output luminance $Y_{max}$ of the display device, and $S_{min}$ has a value of 1.0 or more.

The formula for the value of $Y_{upper}$ is derived from eqn. 4, considering both the reflectivity ρ and the ratio (relative luminance) P with respect to a viewer along an observation direction that has a polar angle θ of 45° from the normal to the display device at at least one azimuth angle around the normal to the display device. By meeting the relationship $Y_{max} \leq Y_{upper}$, it is possible to ensure that the value of S for an off-axis viewer in the observation direction who is a snooper that meets the relationship $S \geq S_{min}$, where $S_{min}$ has a value of 1.0 or more, regardless of how the illuminance level of ambient light and the luminance of the display device vary. By maintaining the relationship $S \geq S_{min}$, where $S_{min}$ has a value of 1.0 or more, an off-axis viewer in that observation direction cannot in practical terms discern the visual security level at or below the limit $S_{min}$ such an off-axis viewer cannot perceive the displayed image, as described above.

Advantageously, $S_{min}$ may have a value of 1.5 or more. Such an increased limit of $S_{min}$ achieves a higher level of visual security in which such the image is effectively invisible to an off-axis viewer along the observation direction for most images and most observers.

Advantageously, $S_{min}$ may have a value of 1.8 or more. Such an increased limit of $S_{min}$ achieves a higher level of visual security in which the image is invisible independent of image content for all observers.

Where the display device has a major axis and a minor axis of symmetry, the equation for $Y_{max}$ may apply for an observation direction having a polar angle θ of 45° from the normal to the display device at an azimuth angle corresponding to either or both of the major axes in order to achieve the advantages with respect to an off-axis viewer with use of the display device in a landscape orientation, or the minor axis in order to achieve the advantages with respect to an off-axis viewer with use of the display device in a portrait orientation.

The control system may also be arranged to control luminance of the displayed image when the privacy function is provided on the basis of the detected level of the ambient light in accordance with a transfer function that maintains a relationship $Y_{max} \geq Y_{lower}$, where $Y_{lower}$ is given by the equation:

$$Y_{lower} = \frac{(\rho(\Delta\theta = 10°)/P(\Delta\theta = 10°)) \cdot I}{(10^{S_{max}} - 1) \cdot \pi} \qquad \text{eqn. 10}$$

where the equation for $Y_{lower}$ applies for an observation direction having a polar angle θ of 10° from the direction of the maximum output luminance of the display device at at least one azimuth angle around the direction of the maximum output luminance of the display device, ρ(Δθ=10°) is the reflectivity of the display device along the observation direction having a polar angle θ of 10° from direction of the maximum output luminance of the display device, P(Δθ=10°) is the ratio of the luminance of the display device along the observation direction having a polar angle θ of 10° from the direction of the maximum output luminance of the display device to the maximum output luminance $Y_{max}$ of the display device, and $S_{max}$ has a value of 0.1 or less.

The formula for the value of $Y_{lower}$ is derived from eqn. 4, considering both the reflectivity ρ and the ratio (relative luminance) P with respect to an observation directions that has a polar angle θ of 10° from the direction of the maximum output luminance of the display device at at least one azimuth angle around the direction of the maximum output luminance of the display device. An on-axis viewer will typically be located along such an observation direction or at a smaller polar angle where the visibility is better.

By meeting the relationship $Y_{max} \geq Y_{lower}$, it is possible to ensure that the value of S for the on-axis viewer meets the relationship $S \leq S_{max}$, where $S_{max}$ has a value of 0.1 or less, regardless of how the illuminance level of ambient light and the luminance of the display device vary. By maintaining the relationship $S \leq S_{max}$, where $S_{max}$ has a value of 0.1 or less, the visibility of the displayed image to an on-axis viewer is maintained, as described above.

Desirable limits for head-on luminance of the display operating in privacy mode will now be described.

Figure 10:
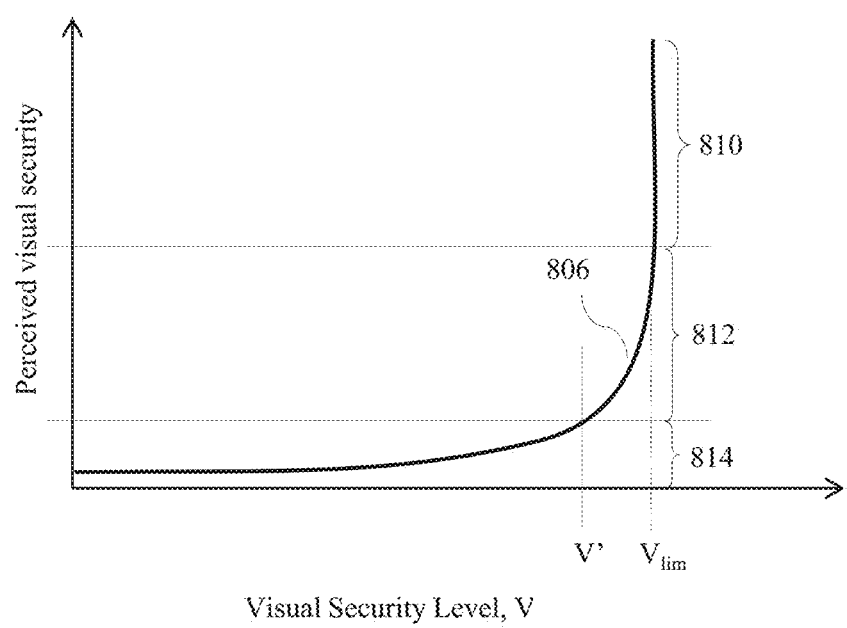
FIG. 10 is a schematic graph illustrating the variation of perceived privacy with visual security level.

FIG. 10 is a schematic graph illustrating the variation 806 of perceived visual security with visual security level, V at an observation angle θ. Visual security level V is a measured quantity of any given display and varies with polar viewing angle.

By comparison with visual security level V, perceived visual security is a subjective judgement of the visibility of a displayed privacy image arising from the human visual system response at the observation angle.

In operation it has been discovered that above a threshold limit Vim, of visual security level V then no image information is perceived. This transition in the perceived visibility with changes in the visual security level V is very rapid, as shown by the steepness of the graph in FIG. 7B around the threshold limit $V_{lim}$. That is, as the visual security level V increases, initially the perceived visibility degrades only gradually and the image is essentially viewable. However, on reaching the threshold limit $V_{lim}$, the perceived image rapidly ceases to be visible in a manner that is in practice surprising to watch.

In observation of the surprising result, for a text document image that is of concern for privacy applications it was found that the perceived image seen by a snooper rapidly ceased to be visible for V of 10. In the region 810 for values of V above 10, all the displayed text had zero visibility. In other words the perceived text rapidly ceases to be visible in a manner that is in practice surprising to watch for V of 10 or greater.

In regions 812 below $V_{lim}$ text was visible with low contrast and in region 814 below V' text was clearly visible.

It would be desirable to maximise head-on display luminance to achieve high image visibility to the primary display user. It would be further desirable to achieve high image security level for a snooper at the observation angle. The selective control of the head-on luminance will now be described in further detail.

For an observation angle θ, the maximum display output luminance $Y_{max}$ (typically the head-on luminance) is pre-vented from exceeding a luminance limit $Y_{lim}$ at which the visual security level V is above the threshold limit $V_{lim}$ so that the image is not perceived as visible at that observation angle θ, the luminance limit $Y_{lim}$ being given by:

$$Y_{lim} = \frac{R\theta + V_{lim} * K\theta}{(V_{lim} - 1) * P\theta} \qquad \text{eqn. 11}$$

where Rθ is the reflected ambient illuminance at the observation angle θ, Kθ is the display black state luminance at the observation angle, and Pθ is the relative luminance at the observation angle θ compared to the maximum display output luminance $Y_{max}$ (typically the head-on luminance and is measured in nits). For display reflectivity ρθ and a Lambertian illuminant with illuminance Iθ measured in lux that is reflected by the display at the observation angle, the luminance limit $Y0_{lim}$ is also given by:

$$Y_{lim} = \frac{\frac{\rho\theta * I\theta}{\pi} + V_{lim} * K\theta}{(V_{lim} - 1) * P\theta} \qquad \text{eqn. 12}$$

Since the illuminance Iθ is dependent on the amount of ambient light, the luminance of the display device may be controlled by the control system 500 in accordance with these relationships. Specifically, the privacy transfer function 804 used by the control system 500 as described above may be selected to maintain the relationship $Y_{max} \leq Y_{lim}$ in order that the image is not perceived as visible at a desired observation angle θ, for example at an observation angle 0 of 45 degrees laterally and zero degrees in elevation from the normal to the display device.

Subject to that limit, the luminance is preferably as high as possible in order to optimise the performance for the head-on view. Accordingly, the privacy transfer function 804 used by the control system 500 as described above may additionally be selected to maintain the relationship $Y_{max}/I\theta \geq 1$ lux/nit as illustrated by the profile 805 in FIG. 7B. The illuminance Iθ may be the sensed ambient illuminance that is averaged from the illuminated scene.

Advantageously a display may be provided that has high image security to off-axis snoopers while achieving high image visibility for the head-on user for different illuminance levels.

Further description of the control of a privacy display will now be described.

Figure 11:
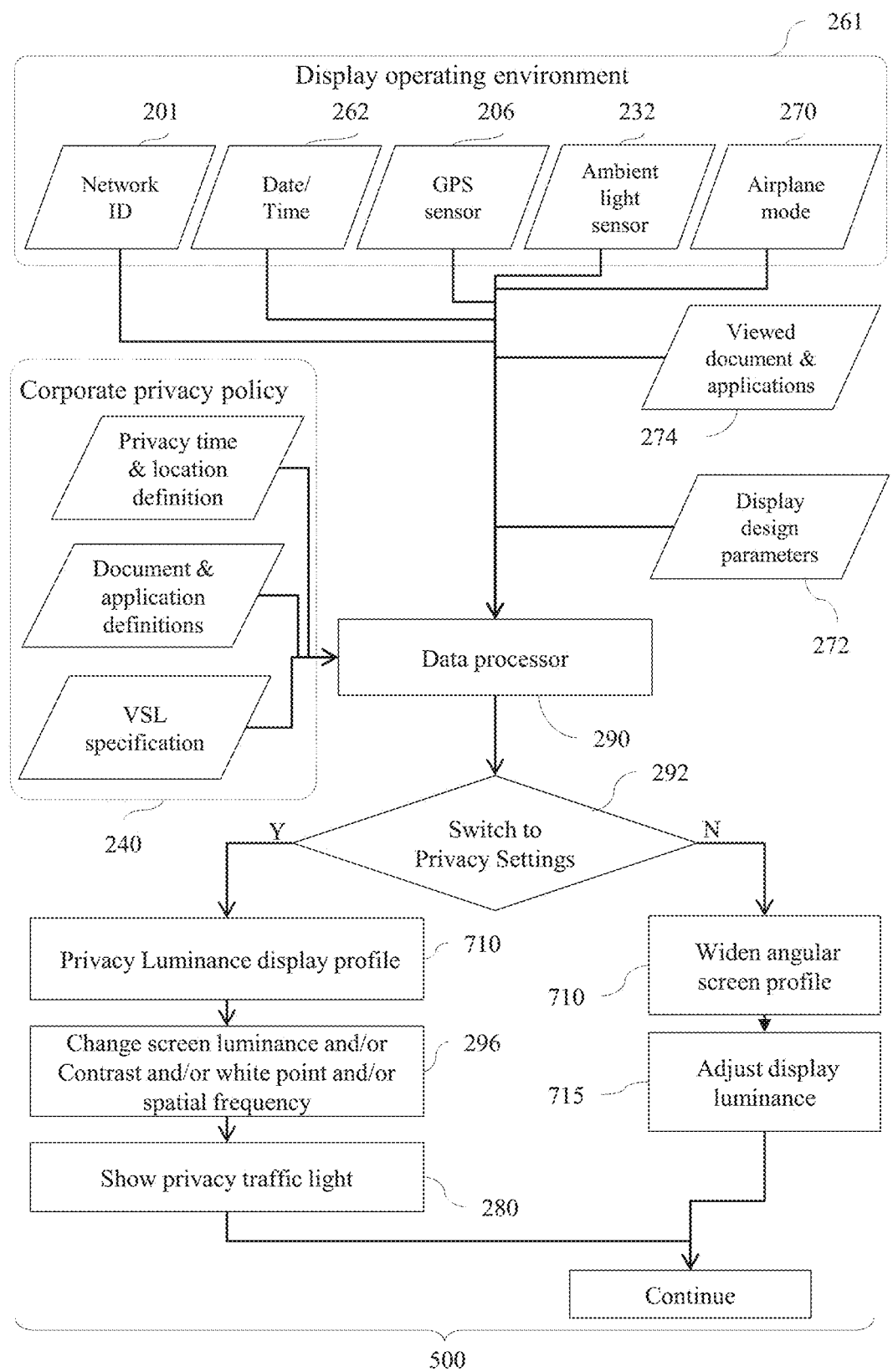
FIG. 11 illustrates a flowchart of the privacy control system of FIGS. 1-2 and FIGS. 3-4.

FIG. 11 illustrates a flowchart of the privacy control system of FIGS. 1-2 and FIGS. 3-4.

The display operating environment 261 may include (but is not limited to) network ID 201, Date/Time 262, GPS 206 data, Ambient Light Sensor 232 detection and Airplane mode 270 setting.

Corporate privacy policy 240 may include definitions under which the display should be operated in privacy mode including time and location; documents and applications; and visual security level specifications.

Other inputs may include display design parameters 272 and information on viewed documents and applications 274.

Data processor 290 is used to analyse display operating environment 261, display design parameters 272, viewed documents and applications 274 and compare against corporate privacy policy 240. The output determines whether to operate the display in privacy or public mode such that switch 292 is set for privacy or public mode operation based on data processor 290 output.

In the case of privacy mode operation the settings to apply to the display device 100 using display control system 710 and images 101 using image control system 296 in order to achieve desirable visual security level are provided. Further indication of visual security level using indicator 280 may be provided.

In the case of public mode operation, the appropriate illumination control including cone angle change by display control system 710 and luminance using LED driver 715 are provided to the display device 100.

The controller 500 may continue to monitor the status of the display operating environment 261 and appropriate changes in policy 240 and adjust display device 100 and images 101 appropriately to maintain the target visual security level.

Advantageously the control system 500 may enable the visual security level, that may be the visual security level to be reliably calculated and compared to a corporate policy 240 level set for the device's current environment. The visual security level may be adjusted to the level required for the display device 100 environment so that the primary user retains optimal viewing freedom and comfort consistent with achieving the prescribed corporate privacy policy privacy level.

Features of the embodiment of FIG. 11 not discussed in further detail may be assumed to correspond to the features with equivalent reference numerals as discussed above, including any potential variations in the features.

The ambient light sensor 232 may be of a type that detects the illuminance level of ambient light incident on the display device in a non-directional manner. In such cases, the detected level of illuminance I represents an average level, so that the effects described above are achieved for off-axis viewers in varied locations.

Alternatively, the ambient light sensor 232 may be of a type that detects the illuminance level of ambient light incident on the display device along an incident direction for reflection to the observation direction. In this case, it is possible to measure ambient illuminance in directions that correspond to locations in which ambient light reflectivity contributes to snooper security. This allows the effects described above to be optimised specifically for an off-axis viewer in the observation direction. Some examples of such an approach are as follows.

Figure 12A:
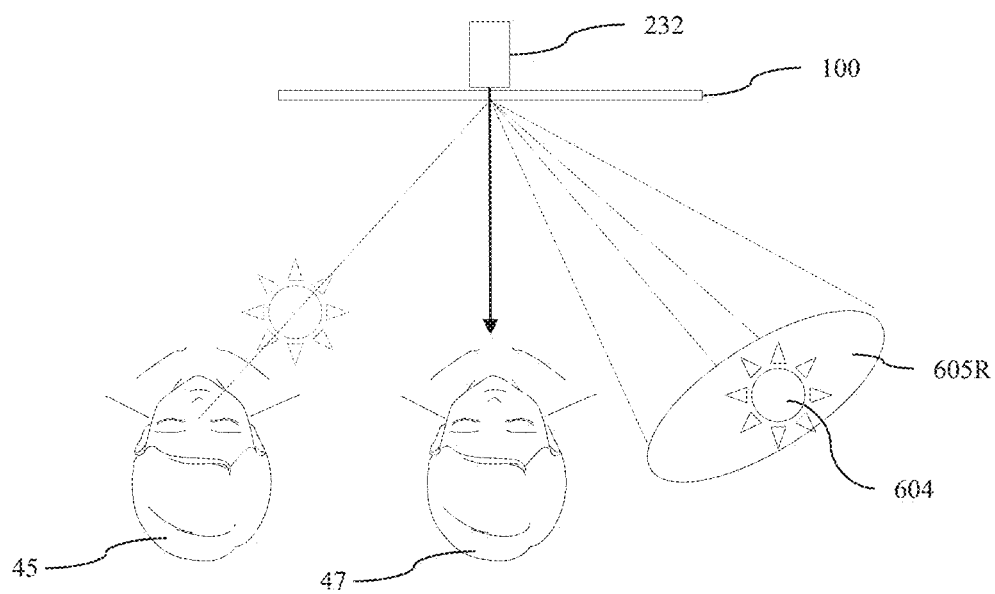
FIG. 12A is a schematic diagram illustrating a top view of a privacy display and off-axis ambient light sensor.

FIG. 12A is a schematic diagram illustrating a top view of a privacy display and off-axis ambient light sensor. Ambient light source 604 is reflected to snooper 45 by privacy display 100. Ambient light sensor 232 is arranged to measure ambient illuminance in light cone 605R. In operation, the output of the ambient light sensor 232 is arranged to adjust the luminance to the user 47 to achieve a desirable visual security level for the ambient illuminance. In operation, the snooper only sees reflected ambient light from regions around the direction of light cone 605R for typical displays with no or limited diffuser (for example with front surface diffusers with a diffusion of AG50 or less).

Figure 12B:
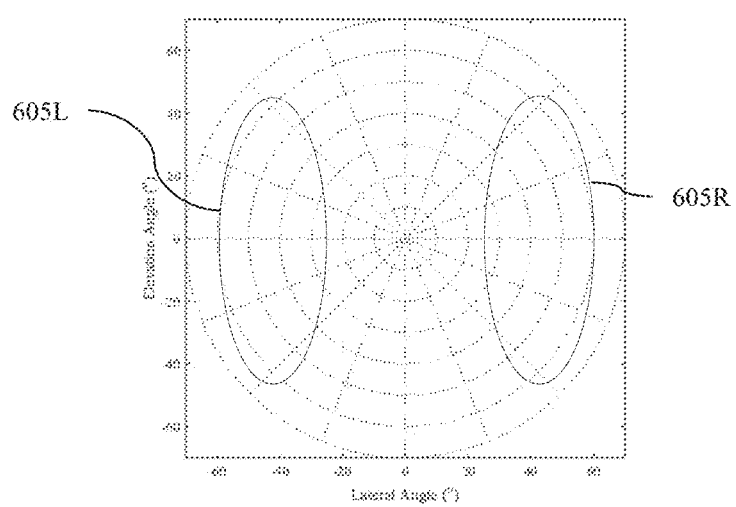
FIG. 12B is a schematic graph illustrating polar regions for measurement of ambient illuminance for a privacy display.

FIG. 12B is a schematic graph illustrating polar regions for measurement of ambient illuminance for a privacy display. FIG. 12B thus indicates the polar locations 605R, 605L within which ambient light sources may be arranged to contribute to the visual security level as observed by off-axis snoopers. Ambient light sources that are located elsewhere do not contribute to visual security factor. It is undesirable to provide reduction of head-on luminance to compensate for ambient illuminance that is not providing increased visual security level, that is light sources outside the regions 605L, 605R.

Ambient light sensors that preferentially measure illuminance in the polar regions 605L, 605R will now be described.

Figure 12C:
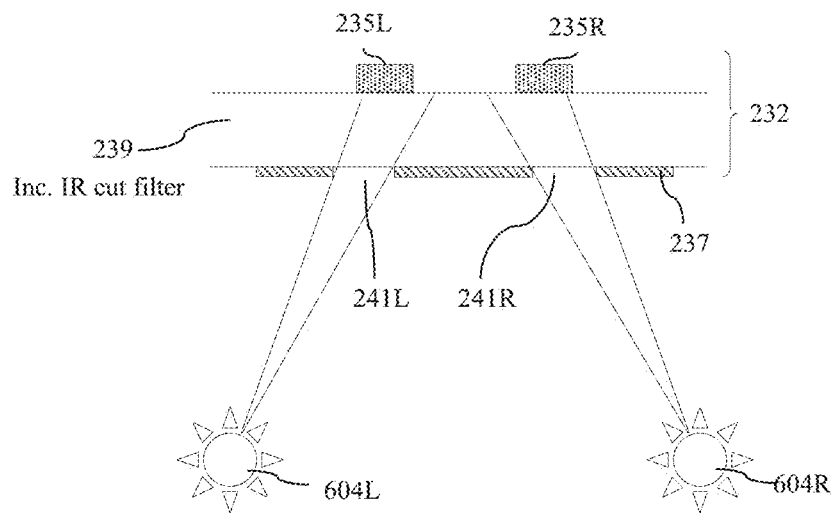
FIGS. 12C, 12D, and 12E are schematic diagrams illustrating top views of off-axis ambient light sensors for measurement of the ambient illuminance in the polar regions of FIG. 12B.
Figure 12D:
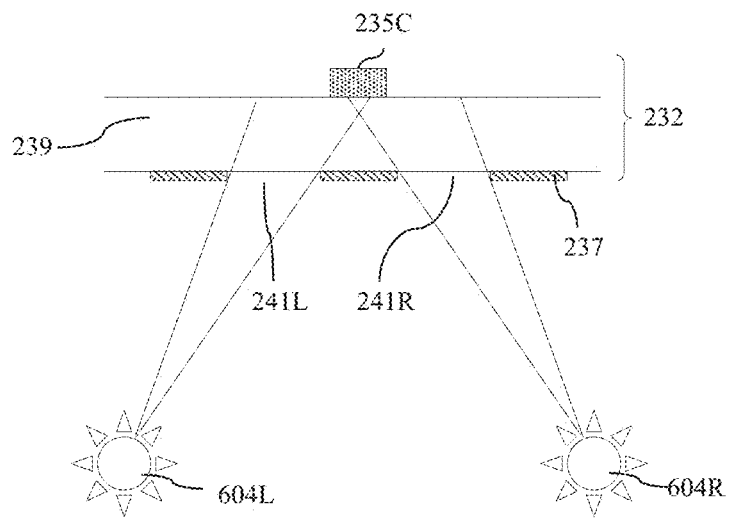
Figure 12E:
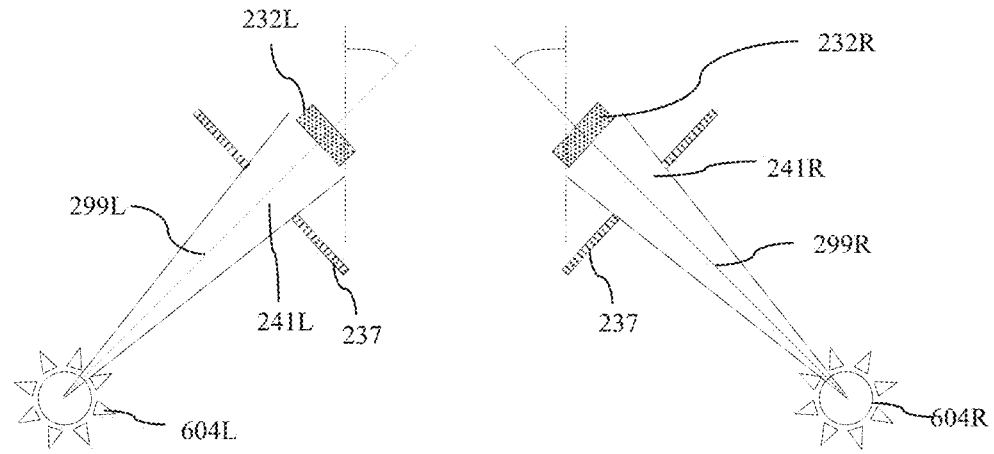

FIGS. 12C-E are schematic diagrams illustrating top views of off-axis ambient light sensors for measurement of the ambient illuminance in the polar regions of FIG. 12B.

FIG. 12C illustrates ambient light sensor 232 that comprises a mask 237 with apertures 241R, 241L that are separated by spacer 239 from the mask 237. Sensor 235L measures ambient illuminance from off-axis ambient light source 604L while sensor 235R measures ambient illuminance from off-axis ambient light source 604R. Advantageously in privacy mode of operation, the visual security level provided to the snooper may be increased in response to appropriately placed ambient light sources 604R, 605L.

FIG. 12D is similar to FIG. 12C other than the two sensors 235L, 235R are replace by a single sensor 235C. Advantageously cost is reduced.

FIG. 12E illustrates an embodiment wherein the sensors 235L, 235R and masks 237L, 237R are tilted with respect to the normal direction to the display device 100, with optical axes 299L, 299R that are directed towards the centres of the regions 605L, 605R. Advantageously in comparison to the arrangement of FIG. 12C stray light may be reduced and accuracy of measurement improved.

In the embodiments of FIGS. 12C-E the apertures 241 and sensors 232 may be shaped to achieve matching measurement directions to the polar locations 605L, 605R of FIG. 12B.

The ALS may include a number of detector or detection channels that are able to detect different spectral bands or infra-red for example. One channel may also be used to detect flicker effects from, for example pulsed LED or fluorescent illumination. The individual detectors above may be multiplexed to an analogue to digital converter to reduce cost.

Illustrative examples of displays that are capable of switching between privacy mode and a public mode will now be described.

FIG. 13 is a schematic diagram illustrating in front perspective view a switchable directional display device 100 comprising a backlight 20, switchable liquid crystal retarder 300 and a spatial light modulator 48.

Display device 100 comprises a directional backlight 20 such as a collimated backlight arranged to output light, the backlight 20 comprising a directional waveguide 1; and plural light sources 15 arranged to input light into the waveguide 1, the waveguide 1, a rear reflector and light control films 5 being arranged to direct light from light sources 15 into solid angular extent 402A. Light control films 5 may comprise turning films and diffusers for example.

In the present disclosure a solid angular extent is the solid angle of a light cone within which the luminance is greater than a given relative luminance to the peak luminance. For example the luminance roll-off may be to a 50% relative luminance so that the solid angular extent has an angular width in a given direction (such as the lateral direction) that is the same as the full-width half maximum (FWHM).

The backlight 20 may be arranged to provide an angular light solid angular extent 402A that has reduced luminance for off-axis viewing positions in comparison to head-on luminance.

Display control system 710 is arranged to provide control of light source driver 715. Luminance of LEDs 15 may be controlled by control system, such that absolute off-axis luminance to a snooper may be controlled.

The spatial light modulator 48 may comprise a liquid crystal display comprising substrates 212, 216, and liquid crystal layer 214 having red, green and blue pixels 220, 222, 224. The spatial light modulator 48 has an input display polariser 210 and an output display polariser 218 on opposite sides thereof. The output display polariser 218 is arranged to provide high extinction ratio for light from the pixels 220, 222, 224 of the spatial light modulator 48. Typical polarisers 210, 218 may be absorbing polarisers such as dichroic polarisers.

Optionally a reflective polariser 208 may be provided between the dichroic input display polariser 210 and backlight 210 to provide recirculated light and increase display efficiency. Advantageously efficiency may be increased.

The optical stack to provide control off-axis luminance will now be described.

Reflective polariser 302, plural retarders 300 and additional polariser 318 are arranged to receive output light from the spatial light modulator 48.

The plural retarders 300 are arranged between the reflective polariser 302 and an additional polariser 318. The polarisers 210, 218, 318 may be absorbing type polarisers such as iodine polarisers while the reflective polariser 302 may be a stretched birefringent film stack such as APF from 3M Corporation or a wire grid polariser.

Plural retarders 300 comprise a switchable liquid crystal retarder 301 comprising a layer 314 of liquid crystal material, and substrates 312, 316 arranged between the reflective polariser 302 and the additional polariser 318. Retarder 300 further comprises a passive retarder 330 as will be described further below.

As described below, plural retarders 300 do not affect the luminance of light passing through the reflective polariser 302, the retarders 300 and the additional polariser 318 along an axis along a normal to the plane of the retarders 300 but the retarders 300 do reduce the luminance of light passing therethrough along an axis inclined to a normal to the plane of the retarders 300, at least in one of the switchable states of the switchable retarder 301. This arises from the presence or absence of a phase shift introduced by the retarders 300 to light along axes that are angled differently with respect to the liquid crystal material of the retarders 300.

Transparent substrates 312, 316 of the switchable liquid crystal retarder 301 comprise electrodes arranged to provide a voltage across a layer 314 of liquid crystal material 414 therebetween. Control system 752 is arranged to control the voltage applied by voltage driver 350 across the electrodes of the switchable liquid crystal retarder 301.

Features of the embodiment of FIG. 13 not discussed in further detail may be assumed to correspond to the features with equivalent reference numerals as discussed above, including any potential variations in the features.

As will be described further below, the additional polariser 318, plural retarders 300 and reflective polariser 302 may be arranged to provide polar control of output luminance and frontal reflectivity from ambient illumination 604.

An example of an optical stack to provide control of off-axis luminance will now be described.

Figure 14:
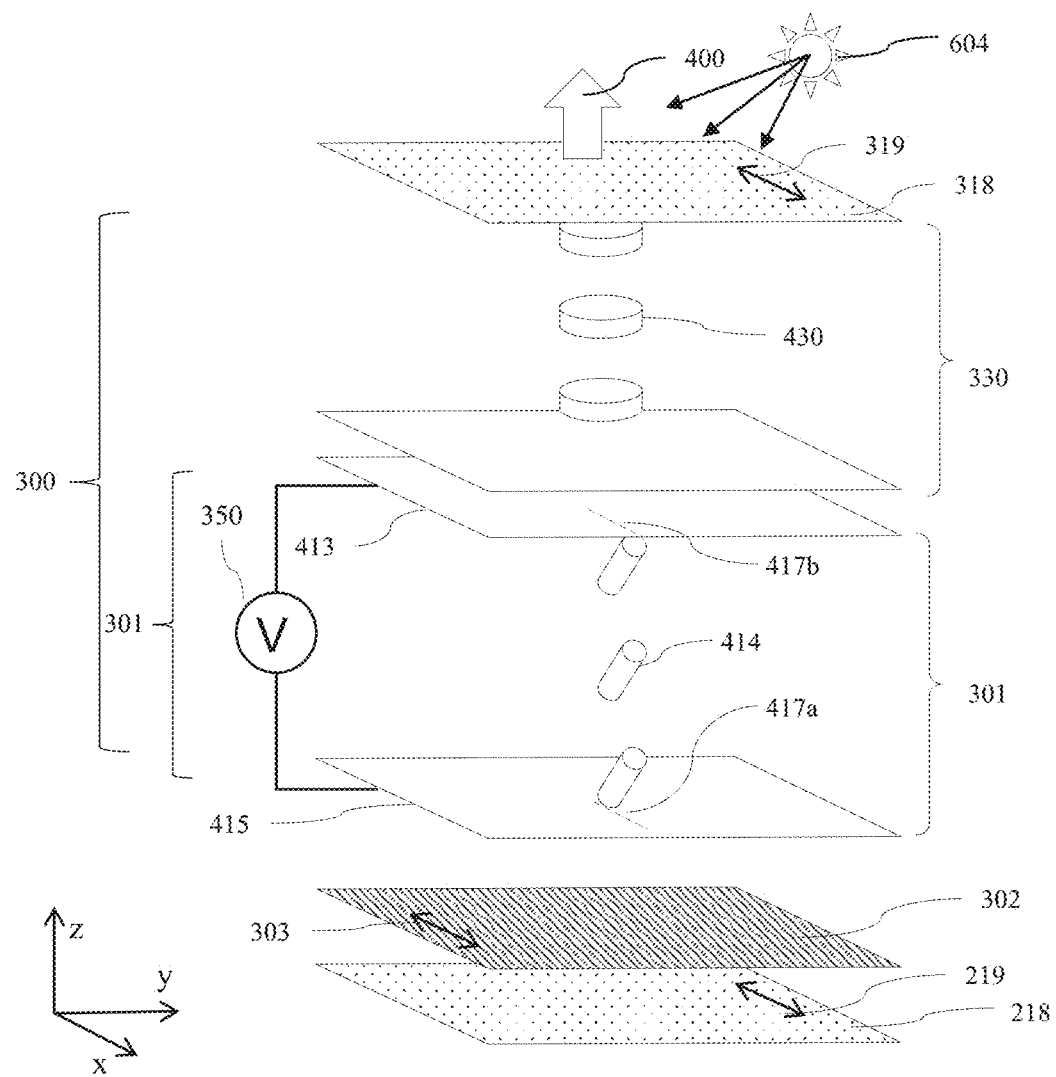
FIG. 14 is a schematic diagram illustrating in perspective side view an arrangement of a switchable liquid crystal retarder comprising a passive negative C-plate compensation retarder in a privacy mode of operation.

FIG. 14 is a schematic diagram illustrating in perspective side view an arrangement of the plural retarders 300 in a privacy mode of operation comprising a negative C-plate passive retarder 330 and homeotropically aligned switchable liquid crystal retarder 301 in a privacy mode of operation. In FIG. 14, some layers of the optical stack are omitted for clarity. For example the switchable liquid crystal retarder 301 is shown omitting the substrates 312, 316.

The switchable liquid crystal retarder 301 comprises two surface alignment layers disposed on electrodes 413, 415 and adjacent to the layer of liquid crystal material 414 and on opposite sides thereof and each arranged to provide homeotropic alignment in the adjacent liquid crystal material 414. The layer of liquid crystal material 414 of the switchable liquid crystal retarder 301 comprises a liquid crystal material with a negative dielectric anisotropy. The liquid crystal molecules 414 may be provided with a pretilt, for example 88 degrees from the horizontal to remove degeneracy in switching.

The electric vector transmission direction of the reflective polariser 302 is parallel to the electric vector transmission direction of the output polariser 218. Further the electric vector transmission direction 303 of the reflective polariser 302 is parallel to the electric vector transmission direction 319 of the additional polariser 318.

The switchable liquid crystal retarder 301 comprises a layer 314 of liquid crystal material 414 with a negative dielectric anisotropy. The passive retarder 330 comprises a negative C-plate having an optical axis perpendicular to the plane of the retarder 330, illustrated schematically by the orientation of the discotic material 430.

The liquid crystal retarder 301 further comprises transmissive electrodes 413, 415 arranged to control the liquid crystal material, the layer of liquid crystal material being switchable by means of adjusting the voltage being applied to the electrodes. The electrodes 413, 415 may be across the layer 314 and are arranged to apply a voltage for controlling the liquid crystal retarder 301. The transmissive electrodes are on opposite sides of the layer of liquid crystal material 414 and may for example be ITO electrodes.

Alignment layers may be formed between electrodes 413, 415 and the liquid crystal material 414 of the layer 314. The orientation of the liquid crystal molecules in the x-y plane is determined by the pretilt direction of the alignment layers so that each alignment layer has a pretilt wherein the pretilt of each alignment layer has a pretilt direction with a component 417a, 417b in the plane of the layer 314 that is parallel or anti-parallel or orthogonal to the electric vector transmission direction 303 of the reflective polariser 302.

Driver 350 provides a voltage V to electrodes 413, 415 across the layer 314 of switchable liquid crystal material 414 such that liquid crystal molecules are inclined at a tilt angle to the vertical. The plane of the tilt is determined by the pretilt direction of alignment layers formed on the inner surfaces of substrates 312, 316.

In typical use for switching between a public mode and a privacy mode, the layer of liquid crystal material is switchable between two states, the first state being a public mode so that the display may be used by multiple users, the second state being a privacy mode for use by a primary user with minimal visibility by snoopers. The switching may be by means of a voltage being applied across the electrodes. In general such a display may be considered having a first wide angle state and a second reduced off-axis luminance state.

Features of the embodiment of FIG. 14 not discussed in further detail may be assumed to correspond to the features with equivalent reference numerals as discussed above, including any potential variations in the features.

Polar profiles of various elements of an illustrative embodiment of the stack of FIG. 13 will now be described.

Figure 15A:
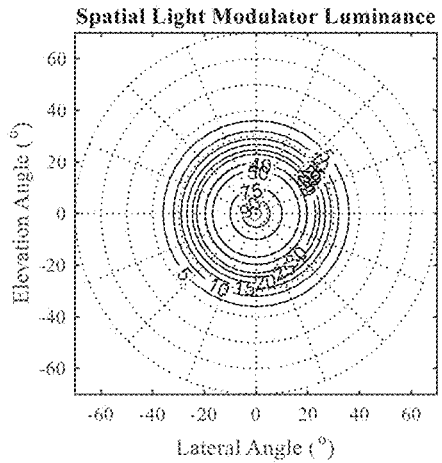
FIG. 15A is a schematic graph illustrating the polar and azimuthal variation of output luminance of a collimated backlight and spatial light modulator.

FIG. 15A is a schematic graph illustrating the polar and azimuthal variation of output luminance of a collimated backlight and spatial light modulator.

Figure 15B:
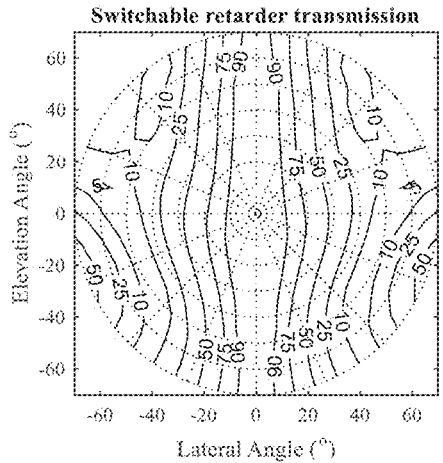
FIG. 15B is a schematic graph illustrating the polar and azimuthal variation of transmission of a switchable retarder arranged between parallel polarisers.

FIG. 15B is a schematic graph illustrating the polar and azimuthal variation of transmission of a switchable retarder arranged between parallel polarisers for the illustrative embodiment of TABLE 2.

TABLE 2

| | Passive retarder(s) | | Active LC retarder | | | | |
| --- | --- | --- | --- | --- | --- | --- | --- |
| Mode | Type | Δn · d/ nm | Alignment layers | Pretilt/ deg | Δn · d/ nm | Δε | Voltage/ V |
| Wide Privacy | Negative C | −660 | Homeotropic Homeotropic | 88 88 | 750 | −4.3 | 0 2.2 |

Figure 15C:
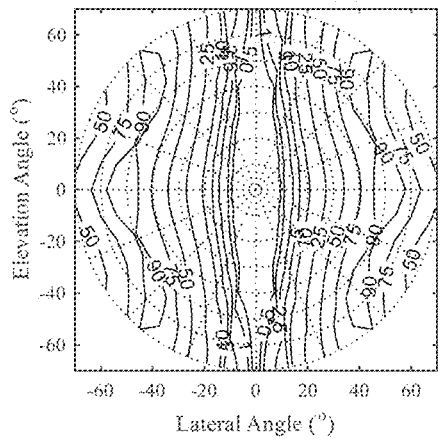
FIG. 15C is a schematic graph illustrating the polar and azimuthal variation of relative reflection of a switchable retarder arranged between a reflective polariser and absorbing polariser.

FIG. 15C is a schematic graph illustrating the polar and azimuthal variation of relative reflection of a switchable retarder arranged between a reflective polariser and absorbing polariser for the illustrative embodiment of TABLE 2.

Figure 15D:
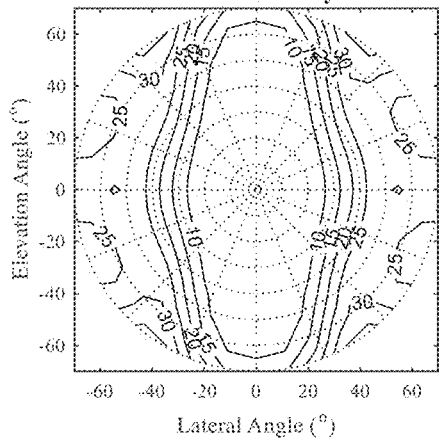
FIG. 15D is a schematic graph illustrating the polar and azimuthal variation of total display reflectivity for the arrangement of FIG. 13 in a privacy mode of operation.

FIG. 15D is a schematic graph illustrating the polar and azimuthal variation of total display reflectivity for the arrangement of FIG. 13 in a privacy mode of operation, that is the polar profile for the reflectivity $\rho(\theta,\phi)$ where $\theta$ is the polar angle and $\phi$ is the azimuthal angle.

Figure 15E:
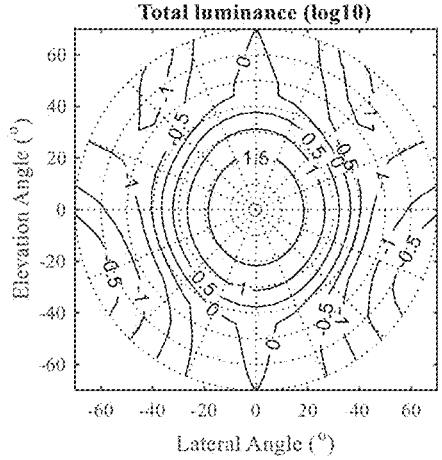
FIG. 15E is a schematic graph illustrating the polar and azimuthal variation of output luminance for the arrangement of FIG. 13 in a privacy mode of operation.

FIG. 15E is a schematic graph illustrating the polar and azimuthal variation of output luminance for the arrangement of FIG. 13 in a privacy mode of operation, that is the polar profile for the privacy level $P(\theta,\phi)$.

Figure 15F:
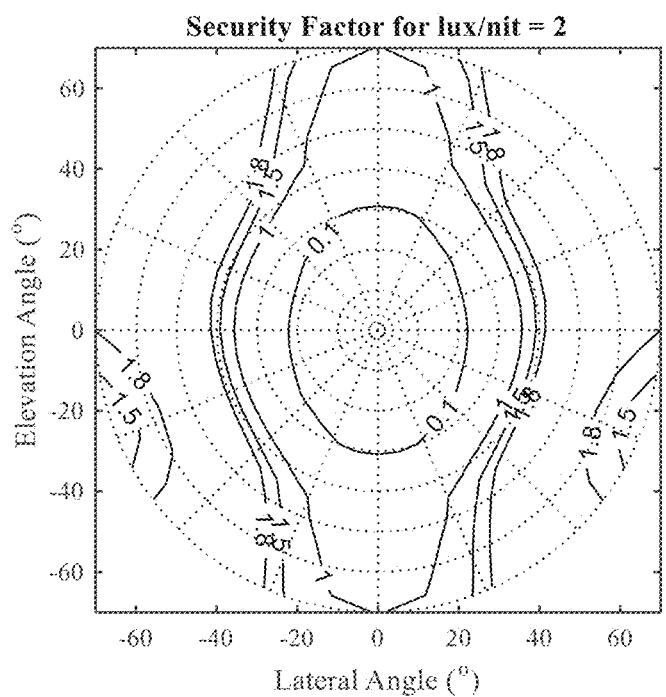
FIG. 15F is a schematic graph illustrating the polar and azimuthal variation of visual security level, S for the arrangement of FIG. 13 in a privacy mode of operation for a display head-on luminance, of value $Y_{max}$ measured in nits that is half of the illuminance of value I measured in lux.

FIG. 15F is a schematic graph illustrating the polar and azimuthal variation of visual security level, $S(\theta,\phi)$ for the arrangement of FIG. 13 in a privacy mode of operation for a display head-on luminance, of value $Y_{max}$ measured in nits that is half of the illuminance of value I measured in lux. Contour lines for S=1.0, S=1.5 and S=1.8 are illustrated to show polar regions of image privacy and image invisibility. Contour lines for S=0.1 are illustrated to show polar regions of high image visibility.

Figure 15G:
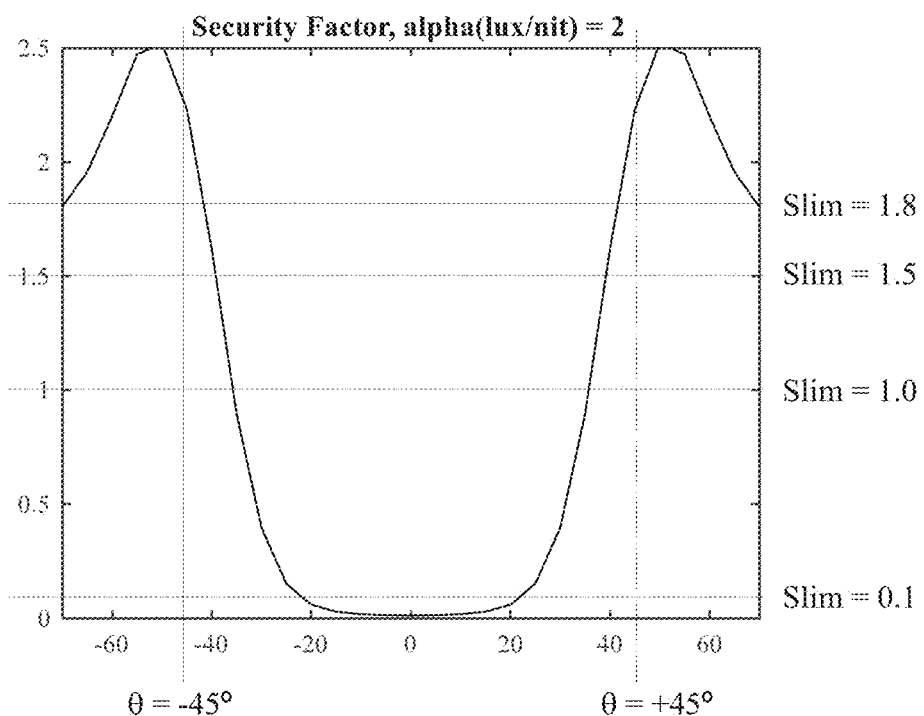
FIG. 15G is a schematic graph illustrating the polar variation of visual security level, S for zero elevation for the arrangement of FIG. 13 in a privacy mode of operation for a display head-on luminance, of value $Y_{max}$ measured in nits that is half of the illuminance of value I measured in lux.

FIG. 15G is a schematic graph illustrating the polar variation of visual security level, S for zero elevation for the arrangement of FIG. 13 in a privacy mode of operation for a display head-on luminance, of value $Y_{max}$ measured in nits that is half of the illuminance of value I measured in lux. At 45 degrees the display is controlled such that the $I/Y_{max}$ ratio (lux/nit) setting of the display is 2.0 and the image is invisible at polar angles of +/−45 degrees.

Operation of the display of FIG. 13 in public mode will now be described.

Figure 16:
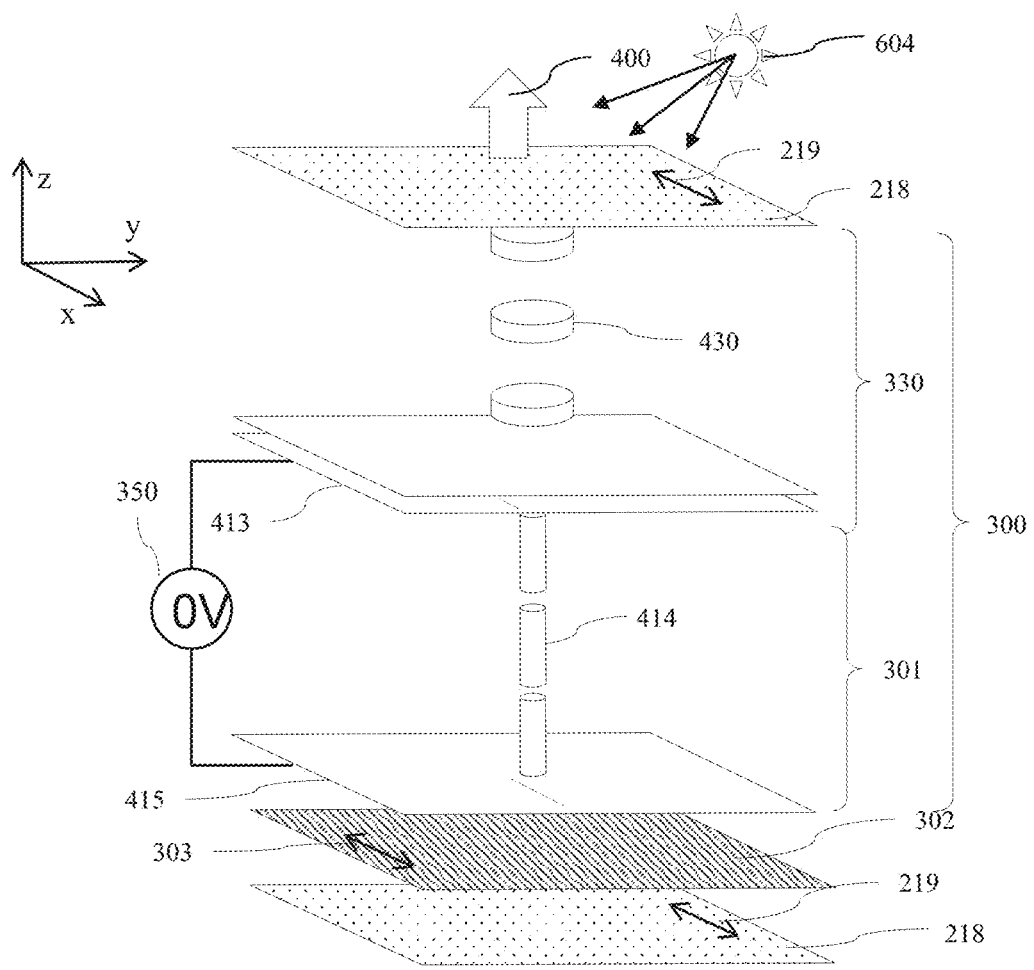
FIG. 16 is a schematic diagram illustrating in perspective side view an arrangement of a switchable retarder in a public mode of operation wherein the switchable retarder comprises a switchable liquid crystal layer with homeotropic alignment and a passive C-plate compensation retarder.

FIG. 16 is a schematic diagram illustrating in perspective side view an arrangement of the retarders 300 in a public mode of operation. In the present embodiment, zero volts is provided across the liquid crystal retarder 301, as in TABLE 2.

In comparison to the arrangement of FIG. 14, no voltage is applied and the molecules of the liquid crystal material 414 are substantially arranged normal to the alignment layers and electrodes 413, 415.

Features of the embodiment of FIG. 16 not discussed in further detail may be assumed to correspond to the features with equivalent reference numerals as discussed above, including any potential variations in the features.

Figure 17A:
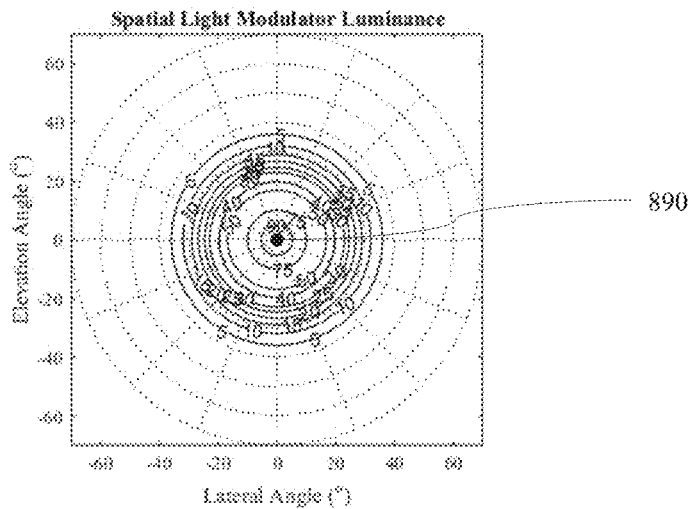
FIG. 17A is a schematic graph illustrating the polar and azimuthal variation of output luminance for the arrangement of FIG. 13 in a public mode of operation.
Figure 17B:
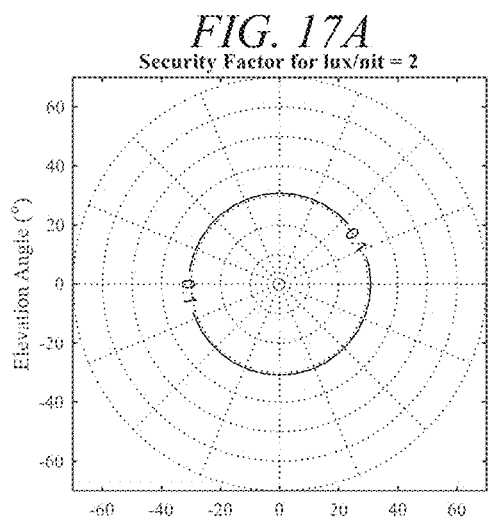
FIG. 17B is a schematic graph illustrating the polar variation of visual security level, S for zero elevation for the arrangement of FIG. 13 in a public mode of operation for a display head-on luminance, of value $Y_{max}$ measured in nits that is half of the illuminance of value I measured in lux.

FIG. 17A is a schematic graph illustrating the polar and azimuthal variation of output luminance for the arrangement of FIG. 13 in a public mode of operation; and FIG. 17B is a schematic graph illustrating the polar variation of visual security level, S for zero elevation for the arrangement of FIG. 13 in a public mode of operation for a display head-on luminance, of value $Y_{max}$ measured in nits that is half of the illuminance of value I measured in lux. In comparison to the arrangement of FIG. 15F, the display remains visible to users over a wide polar region with highest visibility near the axis.

Figure 17C:
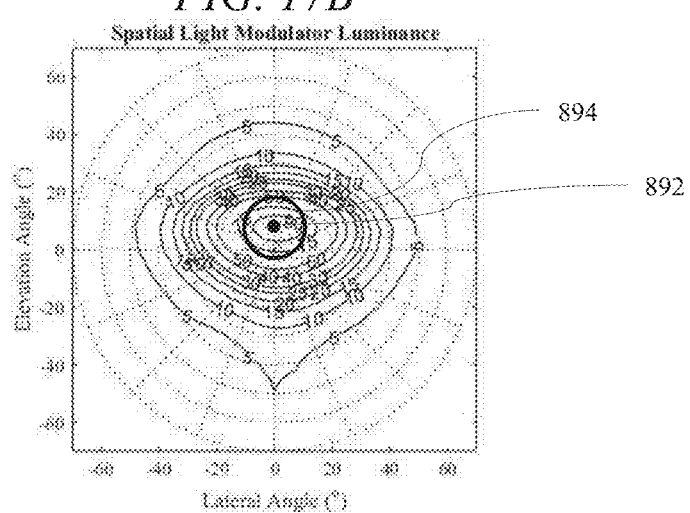
FIG. 17C is a schematic graph illustrating the polar and azimuthal variation of output luminance for a backlight with a direction of maximum luminance $Y_{max}$ that is not normal to the display.

FIG. 17C is a schematic graph illustrating the polar and azimuthal variation of output luminance for a backlight with a direction of maximum luminance $Y_{max}$ that is not normal to the display. In comparison to FIG. 17A, which has $Y_{max}$ at location 890 that is the display normal, FIG. 17C illustrates that $Y_{max}$ is at location 892 that is above the axis. Advantageously display luminance may be increased for users that are looking down onto the display. The observation directions having a polar angle $\theta$ of 10° from the direction of the maximum output luminance of the display device as described in eqn. 10 are illustrated by polar region 894. Desirably at least within region 894 the image visibility of the image to the primary user is high, that is the security factor S is below 0.1.

The propagation of polarised light from the output polariser 218 will now be considered for on-axis and off-axis directions for a display operating in privacy mode.

Figure 18A:
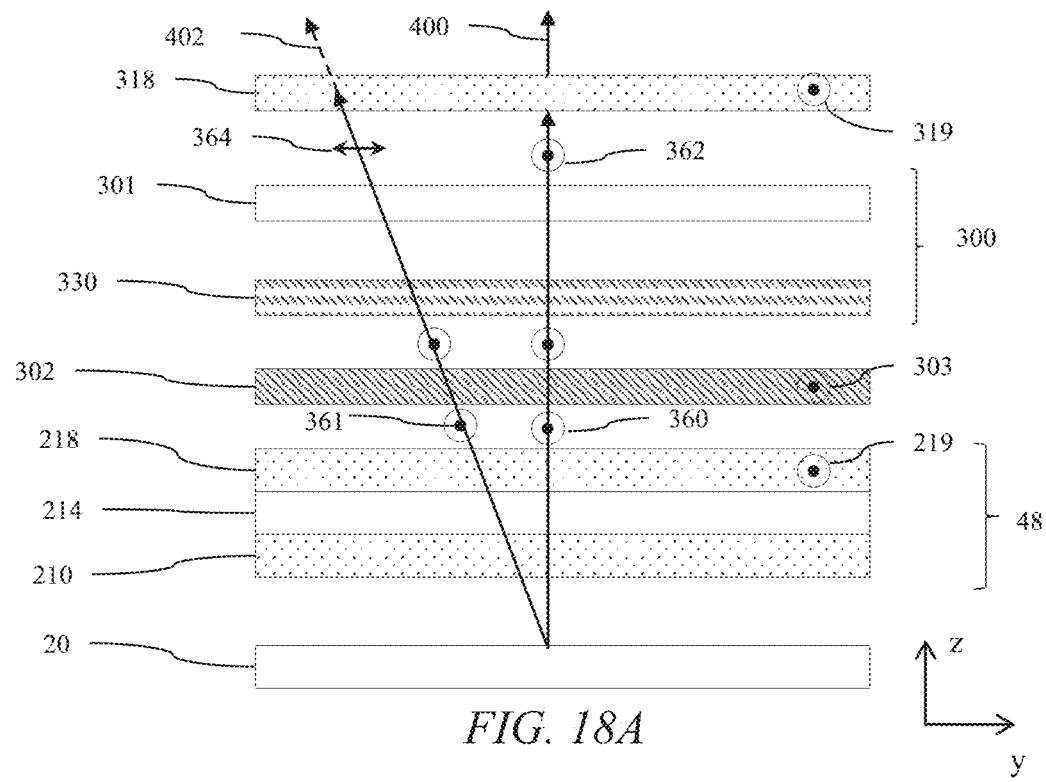
FIG. 18A is a schematic diagram illustrating in side view propagation of output light from a spatial light modulator through the optical stack of FIG. 13 in a privacy mode of operation.

FIG. 18A is a schematic diagram illustrating in side view propagation of output light from a spatial light modulator through the optical stack of FIG. 13 in a privacy mode of operation.

When the layer 314 of liquid crystal material 414 is driven to operate in the privacy mode, the retarders 300 provide no overall transformation of polarisation component 360 to output light rays 400 passing therethrough along an axis perpendicular to the plane of the switchable retarder, but provides an overall transformation of polarisation component 361 to light rays 402 passing therethrough for some polar angles which are at an acute angle to the perpendicular to the plane of the retarders.

Polarisation component 360 from the output polariser 218 is transmitted by reflective polariser 302 and incident on retarders 300. On-axis light has a polarisation component 362 that is unmodified from component 360 while off-axis light has a polarisation component 364 that is transformed by the retarders 300. At a minimum, the polarisation component 361 is transformed to a linear polarisation component 364 and absorbed by additional polariser 318. More generally, the polarisation component 361 is transformed to an elliptical polarisation component, that is partially absorbed by additional polariser 318.

The polar distribution of light transmission illustrated in FIG. 15B modifies the polar distribution of luminance output of the underlying spatial light modulator 48. In the case that the spatial light modulator 48 comprises a directional backlight 20 then off-axis luminance may be further be reduced as described above.

Features of the embodiment of FIG. 18A not discussed in further detail may be assumed to correspond to the features with equivalent reference numerals as discussed above, including any potential variations in the features.

Advantageously, a privacy display is provided that has low luminance to an off-axis snooper while maintaining high luminance for an on-axis observer.

The operation of the reflective polariser 302 for light from ambient light source 604 will now be described for the display operating in privacy mode.

Figure 18B:
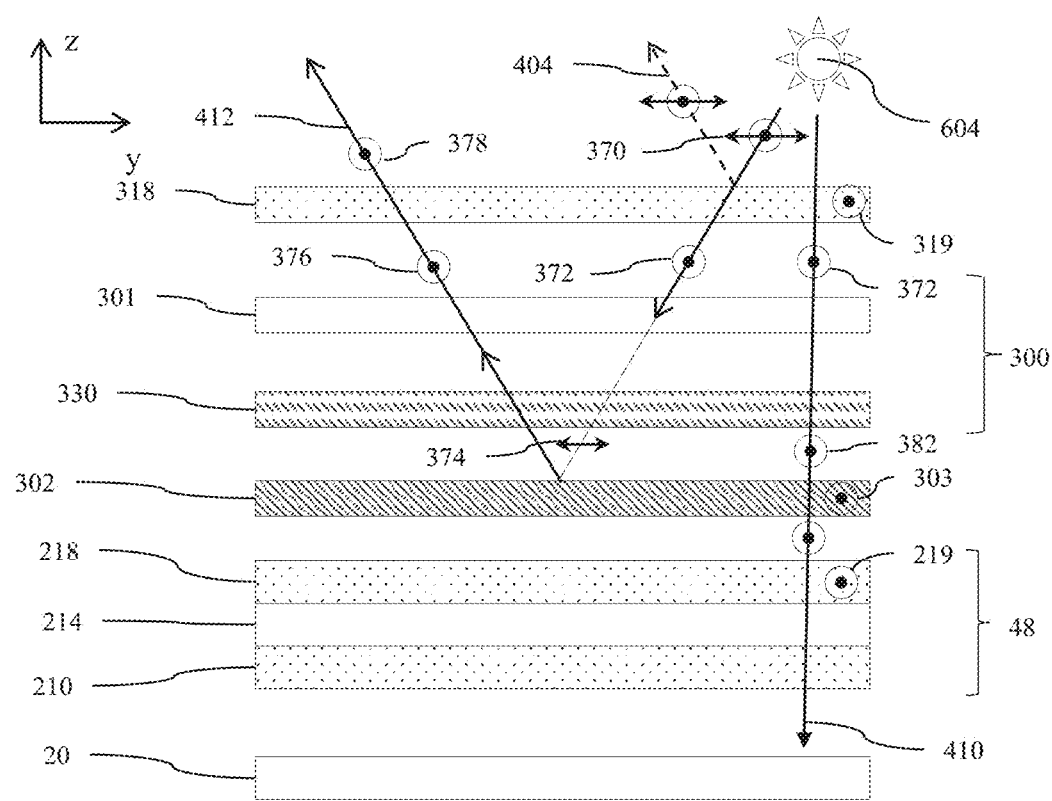
FIG. 18B is a schematic diagram illustrating in top view propagation of ambient illumination light through the optical stack of FIG. 13 in a privacy mode of operation.

FIG. 18B is a schematic diagram illustrating in top view propagation of ambient illumination light through the optical stack of FIG. 13 in a privacy mode of operation.

Ambient light source 604 illuminates the display device 100 with unpolarised light. Additional polariser 318 transmits light ray 410 normal to the display device 100 with a first polarisation component 372 that is a linear polarisation component parallel to the electric vector transmission direction 319 of the additional polariser 318.

In both states of operation, the polarisation component 372 remains unmodified by the retarders 300 and so transmitted polarisation component 382 is parallel to the transmission-axis of the reflective polariser 302 and the output polariser 218, so ambient light is directed through the spatial light modulator 48 and lost.

By comparison, for ray 412, off-axis light is directed through the retarders 300 such that polarisation component 374 incident on the reflective polariser 302 may be reflected. Such polarisation component is re-converted into component 376 after passing through retarders 300 and is transmitted through the additional polariser 318.

Thus when the layer 314 of liquid crystal material is in the second state of said two states, the reflective polariser 302 provides no reflected light for ambient light rays 410 passing through the additional polariser 318 and then the retarders 300 along an axis perpendicular to the plane of the retarders 300, but provides reflected light rays 412 for ambient light passing through the additional polariser 318 and then the retarders 300 at some polar angles which are at an acute angle to the perpendicular to the plane of the retarders 300; wherein the reflected light 412 passes back through the retarders 300 and is then transmitted by the additional polariser 318.

The retarders 300 thus provide no overall transformation of polarisation component 380 to ambient light rays 410 passing through the additional polariser 318 and then the retarder 300 along an axis perpendicular to the plane of the switchable retarder, but provides an overall transformation of polarisation component 372 to ambient light rays 412 passing through the absorptive polariser 318 and then the retarders 300 at some polar angles which are at an acute angle to the perpendicular to the plane of the retarders 300.

The polar distribution of light reflection illustrated in FIG. 15C thus illustrates that high reflectivity can be provided at typical snooper locations by means of the privacy state of the retarders 300. Thus, in the privacy mode of operation, the reflectivity for off-axis viewing positions is increased as illustrated in FIG. 15C, and the luminance for off-axis light from the spatial light modulator is reduced as illustrated in FIG. 15B.

In the public mode of operation, the control system 710, 752, 350 is arranged to switch the switchable liquid crystal retarder 301 into a second retarder state in which a phase shift is introduced to polarisation components of light passing therethrough along an axis inclined to a normal to the plane of the switchable liquid crystal retarder 301.

By way of comparison, solid angular extent 402D may be substantially the same as solid angular extent 402B in a public mode of operation. Such control of output solid angular extents 402C, 402D may be achieved by synchronous control of the sets 15, 17 of light sources and the at least one switchable liquid crystal retarder 300.

Advantageously a privacy mode may be achieved with low image visibility for off-axis viewing and a large solid angular extent may be provided with high efficiency for a public mode of operation, for sharing display imagery between multiple users and increasing image spatial uniformity.

Additional polariser 318 is arranged on the same output side of the spatial light modulator 48 as the display output polariser 218 which may be an absorbing dichroic polariser. The display polariser 218 and the additional polariser 318 have electric vector transmission directions 219, 319 that are parallel. As will be described below, such parallel alignment provides high transmission for central viewing locations.

A transmissive spatial light modulator 48 arranged to receive the output light from the backlight; an input polariser 210 arranged on the input side of the spatial light modulator between the backlight 20 and the spatial light modulator 48; an output polariser 218 arranged on the output side of the spatial light modulator 48; an additional polariser 318 arranged on the output side of the output polariser 218; and a switchable liquid crystal retarder 300 comprising a layer 314 of liquid crystal material arranged between the at least one additional polariser 318 and the output polariser 318 in this case in which the additional polariser 318 is arranged on the output side of the output polariser 218; and a control system 710 arranged to synchronously control the light sources 15, 17 and the at least one switchable liquid crystal retarder 300.

Control system 710 further comprises control of voltage controller 752 that is arranged to provide control of voltage driver 350, in order to achieve control of switchable liquid crystal retarder 301.

Features of the embodiment of FIG. 18B not discussed in further detail may be assumed to correspond to the features with equivalent reference numerals as discussed above, including any potential variations in the features.

Advantageously, a privacy display is provided that has high reflectivity to an off-axis snooper while maintaining low reflectivity for an on-axis observer. As described above, such increased reflectivity provides enhanced privacy performance for the display in an ambiently illuminated environment.

Operation in the public mode will now be described.

Figure 19A:
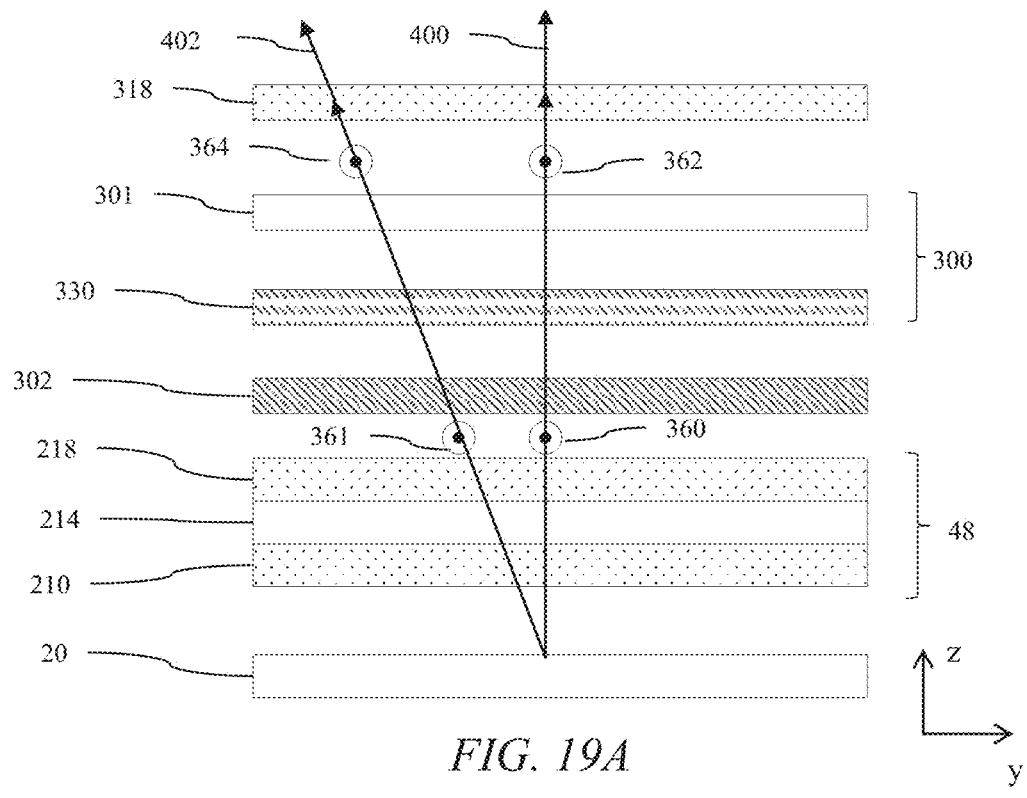
FIG. 19A is a schematic diagram illustrating in side view propagation of output light from a spatial light modulator through the optical stack of FIG. 13 in a public mode of operation.
Figure 19B:
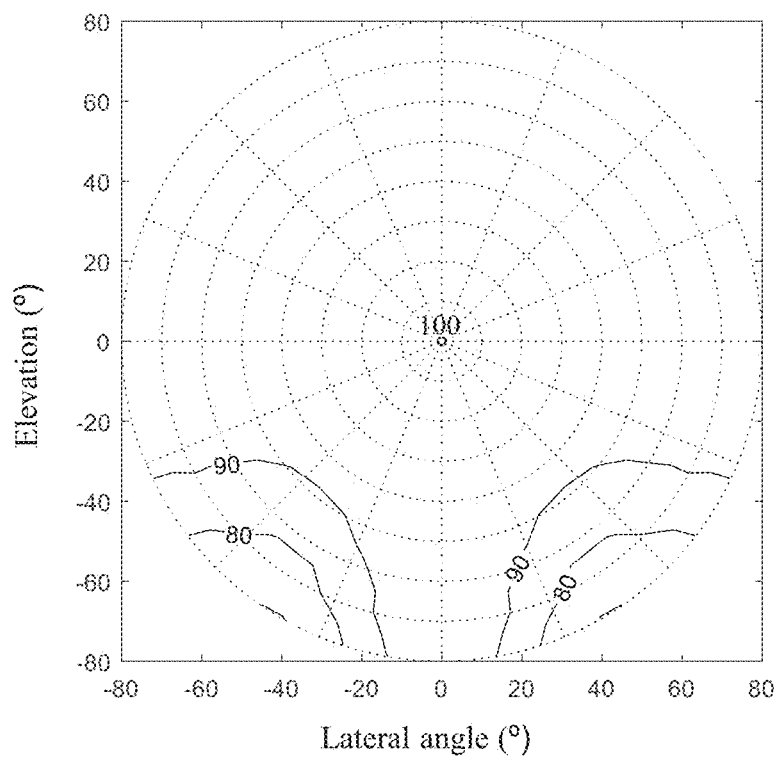
FIG. 19B is a schematic graph illustrating the variation of output luminance with polar direction for the transmitted light rays in FIG. 19A.

FIG. 19A is a schematic diagram illustrating in side view propagation of output light from a spatial light modulator through the optical stack of FIG. 1 in a public mode of operation; and FIG. 19B is a schematic graph illustrating the variation of output luminance with polar direction for the transmitted light rays in FIG. 19A.

Features of the embodiment of FIG. 19A and FIG. 19B not discussed in further detail may be assumed to correspond to the features with equivalent reference numerals as discussed above, including any potential variations in the features.

When the liquid crystal retarder 301 is in a first state of said two states, the retarders 300 provide no overall transformation of polarisation component 360, 361 to output light passing therethrough perpendicular to the plane of the switchable retarder 301 or at an acute angle to the perpendicular to the plane of the switchable retarder 301. That is polarisation component 362 is substantially the same as polarisation component 360 and polarisation component 364 is substantially the same as polarisation component 361.

Thus the angular transmission profile of FIG. 19B is substantially uniformly transmitting across a wide polar region. Advantageously a display may be switched to a wide field of view.

Figure 21A:
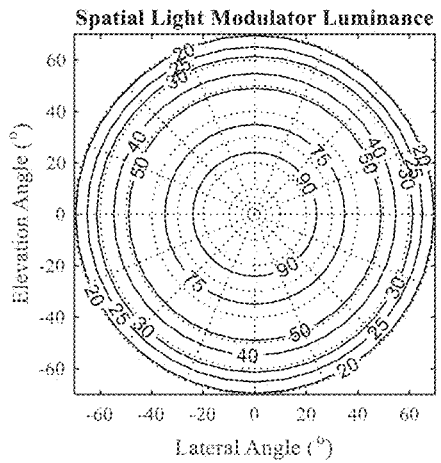
FIG. 21A is a schematic graph illustrating the polar and azimuthal variation of output luminance of an emissive spatial light modulator.
Figure 21B:
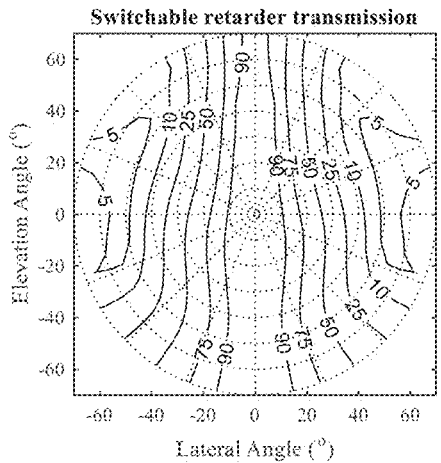
FIG. 21B is a schematic graph illustrating the polar and azimuthal variation of transmission of a first switchable retarder arranged between a first pair of parallel polarisers.

FIG. 21B is a schematic graph illustrating the polar and azimuthal variation of transmission of a first switchable retarder arranged between a first pair of parallel polarisers for the illustrative embodiment of TABLE 3.

TABLE 3

| Layer | Alignment type | Pretilt/ deg | In-plane alignment direction | LC layer 314 retardance | Additional passive retarder 330 type | Additional passive retarder 330 retardance |
|---|---|---|---|---|---|---|
| 301B | Homogeneous | 2 | 270 | 1250 nm | | |
| | Homeotropic | 88 | 90 | | | |
| 330B | | | | | Negative C-plate | −1000 nm |
| 301A | Homogeneous | 2 | 180 | 1250 nm | | |
| | Homeotropic | 88 | 0 | | | |
| 330A | | | | | Negative C-plate | −1000 nm |

Figure 19C:
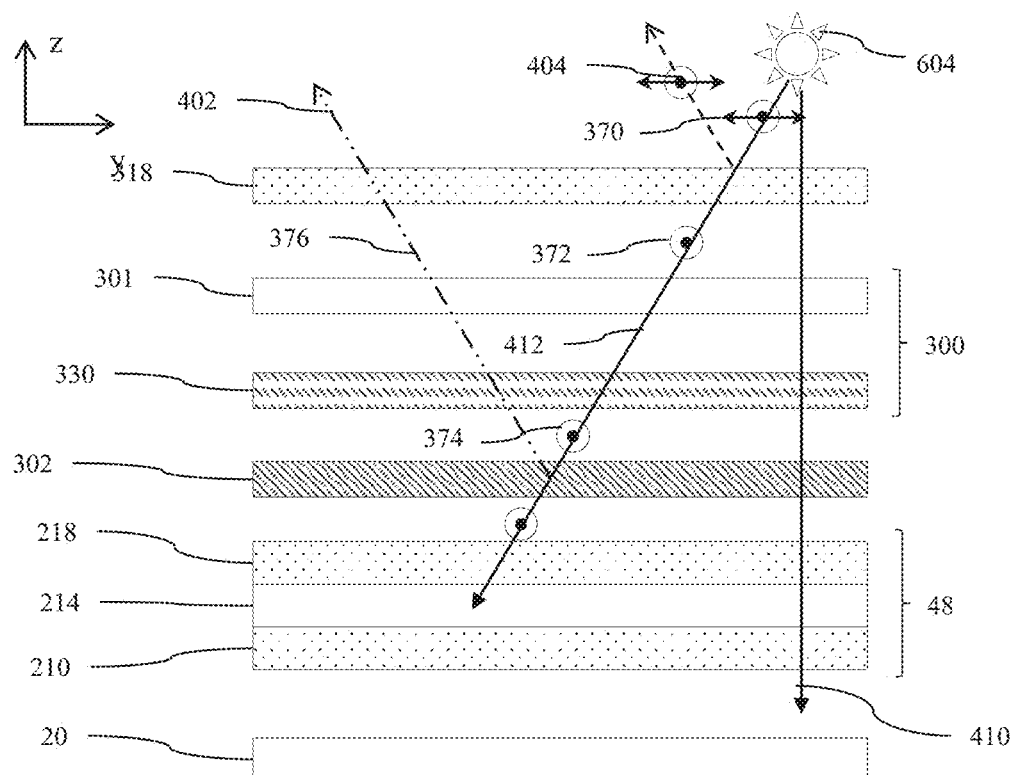
FIG. 19C is a schematic diagram illustrating in top view propagation of ambient illumination light through the optical stack of FIG. 13 in a public mode of operation.
Figure 19D:
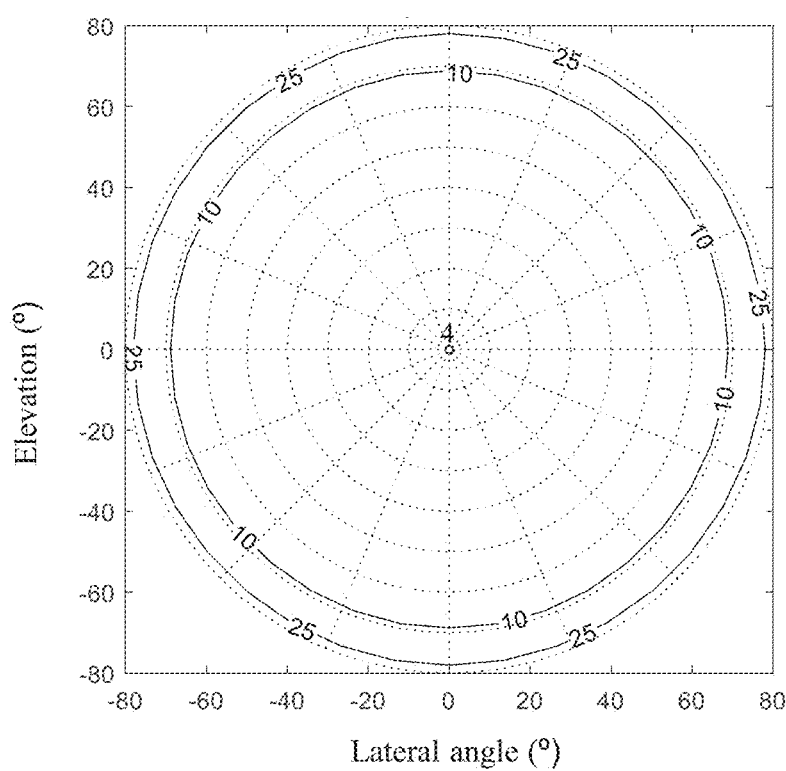
FIG. 19D is a schematic graph illustrating the variation of reflectivity with polar direction for the reflected light rays in FIG. 19C.

FIG. 19C is a schematic diagram illustrating in top view propagation of ambient illumination light through the optical stack of FIG. 1 in a public mode of operation; and FIG. 19D is a schematic graph illustrating the variation of reflectivity with polar direction for the reflected light rays in FIG. 19C.

Thus when the liquid crystal retarder 301 is in the first state of said two states, the retarders 300 provide no overall transformation of polarisation component 372 to ambient light rays 412 passing through the additional polariser 318 and then the retarders 300, that is perpendicular to the plane of the retarders 300 or at an acute angle to the perpendicular to the plane of the retarders 300.

In operation in the public mode, input light ray 412 has polarisation state 372 after transmission through the additional polariser 318. For both head-on and off-axis directions no polarisation transformation occurs and thus the reflectivity for light rays 402 from the reflective polariser 302 is low. Light ray 412 is transmitted by reflective polariser 302 and lost in the display polarisers 218, 210 or the backlight of FIG. 1 or optical isolator 218, 518 in an emissive spatial light modulator 38 of FIG. 2.

Features of the embodiment of FIG. 19C and FIG. 19D not discussed in further detail may be assumed to correspond to the features with equivalent reference numerals as discussed above, including any potential variations in the features.

Advantageously in a public mode of operation, high luminance and low reflectivity is provided across a wide field of view. Such a display can be conveniently viewed with high contrast by multiple observers.

A display apparatus comprising an emissive display will now be described.

Figure 20:
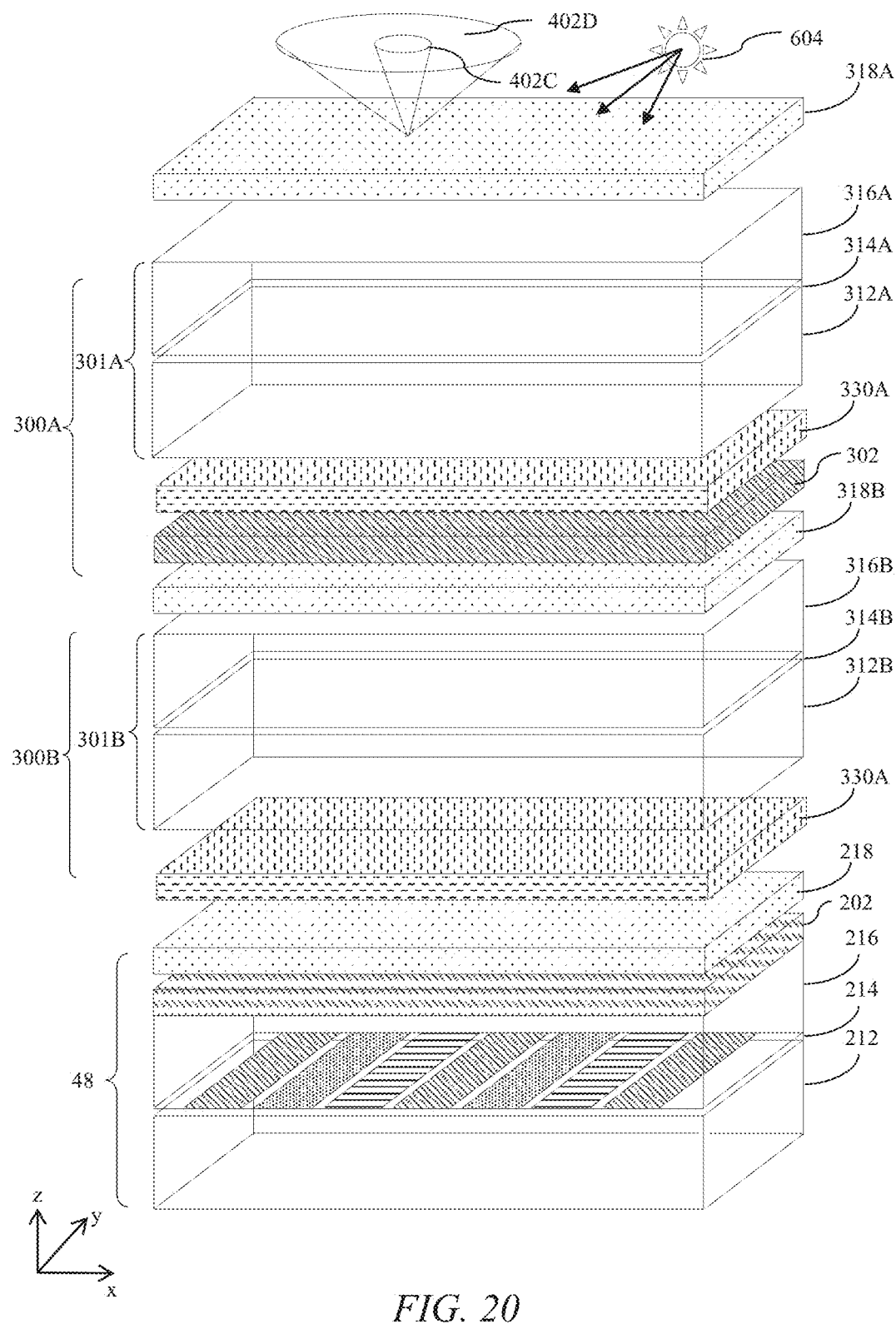
FIG. 20 is a schematic diagram illustrating in front perspective view a switchable directional display device comprising a directional backlight and two switchable liquid crystal retarders each arranged between a pair of polarisers.

FIG. 20 is a schematic diagram illustrating a front perspective view a switchable directional display device comprising a directional backlight and two switchable liquid crystal retarders each arranged between a pair of polarisers. In comparison to the arrangement of FIG. 13, the emissive display such as an OLED display or a micro-LED display comprises a further quarter waveplate 202 between the pixel layer 214 and output polariser 218. Advantageously undesirable reflectivity from the backplane 214 is reduced.

Features of the embodiment of FIG. 20 not discussed in further detail may be assumed to correspond to the features with equivalent reference numerals as discussed above, including any potential variations in the features.

FIG. 21A is a schematic graph illustrating the polar and azimuthal variation of output luminance of an emissive spatial light modulator.

Figure 21C:
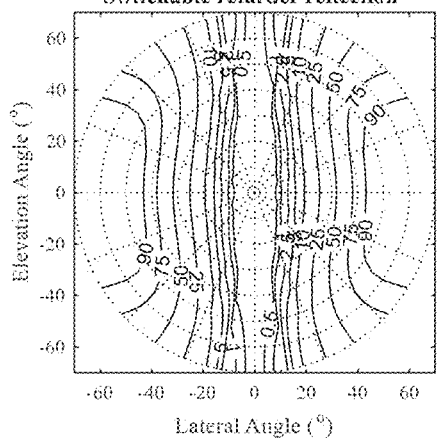
FIG. 21C is a schematic graph illustrating the polar and azimuthal variation of relative reflection of the first switchable retarder arranged between a reflective polariser and absorbing polariser.

FIG. 21C is a schematic graph illustrating the polar and azimuthal variation of relative reflection of the first switchable retarder 300A arranged between a reflective polariser 302 and absorbing polariser 318A for the illustrative embodiment of TABLE 3.

Figure 21D:
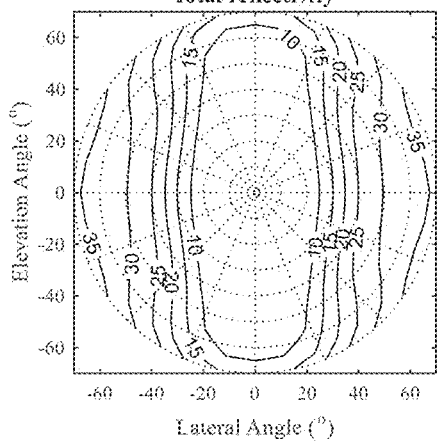
FIG. 21D is a schematic graph illustrating the polar and azimuthal variation of total display reflectivity for the arrangement of FIG. 20 in a privacy mode of operation.

FIG. 21D is a schematic graph illustrating the polar and azimuthal variation of total display reflectivity $\rho(\theta, \phi)$ for the arrangement of FIG. 20 in a privacy mode of operation.

Figure 21E:
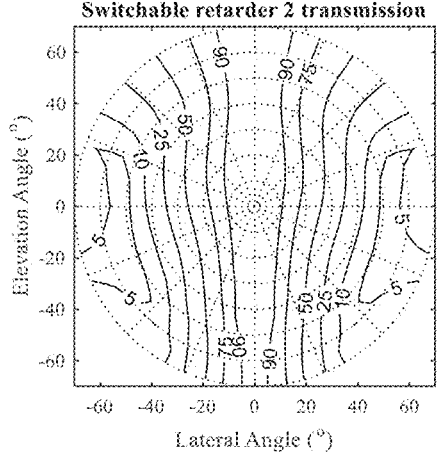
FIG. 21E is a schematic graph illustrating the polar and azimuthal variation of transmission of a second switchable retarder arranged between a second pair of parallel polarisers.

FIG. 21E is a schematic graph illustrating the polar and azimuthal variation of transmission of a second switchable retarder 300B arranged between a second pair of parallel polarisers for the illustrative embodiment of TABLE 3.

Figure 21F:
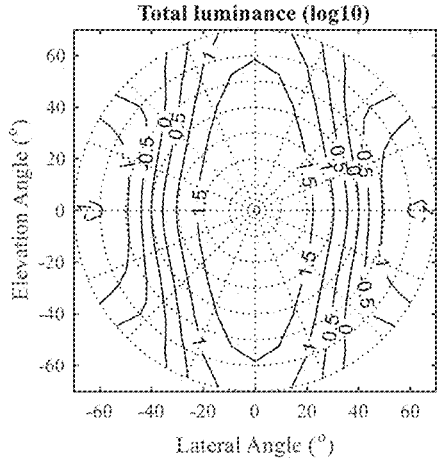
FIG. 21F is a schematic graph illustrating the polar and azimuthal variation of output luminance for the arrangement of FIG. 20 in a privacy mode of operation.

FIG. 21F is a schematic graph illustrating the polar and azimuthal variation of output luminance $P(\theta,\phi)$ for the arrangement of FIG. 20 in a privacy mode of operation.

Figure 21G:
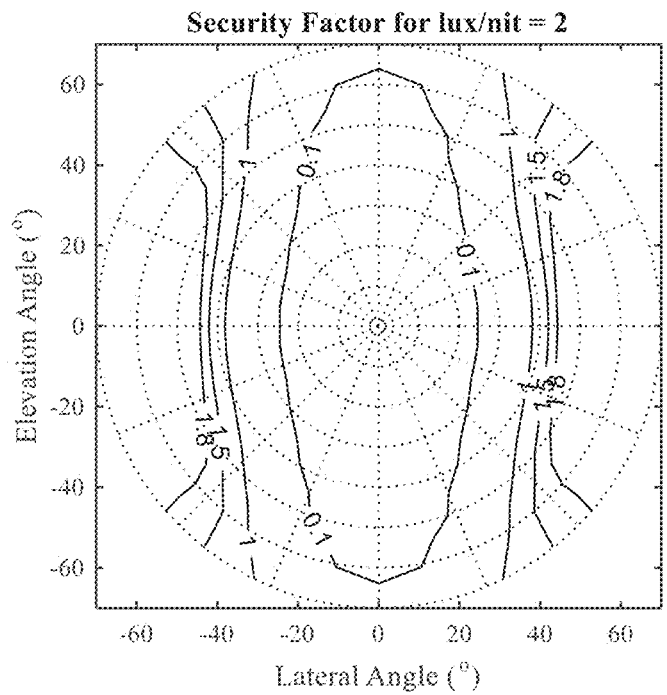
FIG. 21G is a schematic graph illustrating the polar and azimuthal variation of visual security level, S for the arrangement of FIG. 20 in a privacy mode of operation for a display head-on luminance, of value $Y_{max}$ measured in nits that is half of the illuminance of value I measured in lux.

FIG. 21G is a schematic graph illustrating the polar and azimuthal variation of visual security level, S for the arrangement of FIG. 20 in a privacy mode of operation for a display head-on luminance, of value $Y_{max}$ measured in nits that is half of the illuminance of value I measured in lux.

Figure 21H:
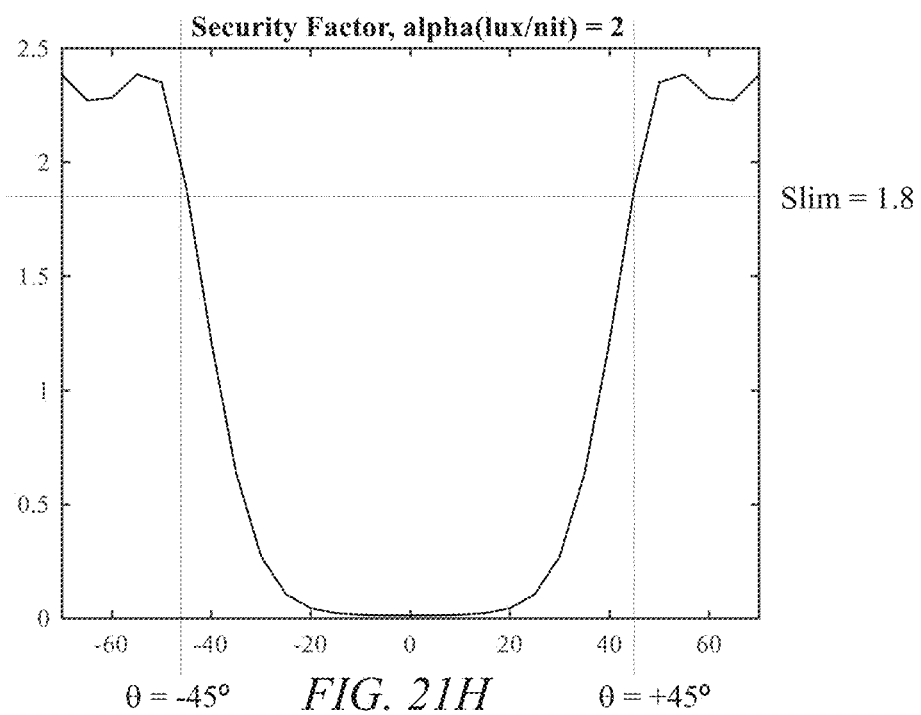
FIG. 21H is a schematic graph illustrating the polar variation of visual security level, S for zero elevation for the arrangement of FIG. 20 in a privacy mode of operation for a display head-on luminance, of value $Y_{max}$ measured in nits that is half of the illuminance of value I measured in lux.

FIG. 21H is a schematic graph illustrating the polar variation of visual security level, S for zero elevation for the arrangement of FIG. 20 in a privacy mode of operation for a display head-on luminance, of value $Y_{max}$ measured in nits that is half of the illuminance of value I measured in lux. Desirably the security level, S is greater than 1.8 at +/−45°.

Other types of switchable privacy display will now be described.

A display device 100 that may be switched between privacy and public modes of operation comprises an imaging waveguide and an array of light sources as described in U.S. Pat. No. 9,519,153, which is incorporated by reference herein in its entirety. The imaging waveguide images an array of light sources to optical windows that may be controlled to provide high luminance on-axis and low luminance off-axis in a privacy mode, and high luminance with a large solid angle cone for public operation.

Switchable angular contrast profile liquid crystal displays are described in Japanese Patent Publ. No. JPH1130783 and in U.S. Patent Publ. No. 2017-0123241, both of which are incorporated by reference herein in their entireties. Such displays may provide out-of-plane tilt of liquid crystal molecules in the liquid crystal layer 214 of a liquid crystal display and may achieve reduced off-axis image contrast in privacy mode of operation. The display device 100 control system 500 may further comprise control of out-of-plane tilt of the liquid crystal molecules.

As may be used herein, the terms "substantially" and "approximately" provide an industry-accepted tolerance for its corresponding term and/or relativity between items. Such an industry-accepted tolerance ranges from zero percent to ten percent and corresponds to, but is not limited to, component values, angles, et cetera. Such relativity between items ranges between approximately zero percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A privacy display apparatus comprising:
a display device arranged to display an image, the display device being capable of providing a privacy function in which the visibility of the image to an off-axis viewer is reduced compared to the visibility of the image to an on-axis viewer;
a control system arranged to control the display device; and
an ambient light sensor arranged to detect the illuminance level of ambient light,
wherein the control system is arranged to control luminance of the displayed image on the basis of the detected level of the ambient light in accordance with a transfer function, and when the privacy function is provided the transfer function maintains a relationship $Y_{max} \leq Y_{upper}$, where $Y_{max}$ is the maximum output luminance of the display device and $Y_{upper}$ is given by the equation:

$$Y_{upper} = \frac{(\rho(\theta = 45°)/P(\theta = 45°)) \cdot I}{(10^{S_{min}} - 1) \cdot \pi}$$

where
the equation for $Y_{upper}$ applies for an observation direction having a polar angle θ of 45° from the normal to the display device at at least one azimuth angle around the normal to the display device,
I is the detected level of the ambient light, the units of I being the units of $Y_{max}$ multiplied by solid angle in units of steradian,
$\rho(\theta$-45°) is the reflectivity of the display device along the observation direction,
$P(\theta$-45°) is the ratio of the luminance of the display device along the observation direction to the maximum output luminance $Y_{max}$ of the display device, and
$S_{min}$ has a value of 1.0 or more.

2. A privacy display apparatus according to claim 1, wherein $S_{min}$ has a value of 1.5 or more.

3. A privacy display apparatus according to claim 1, wherein $S_{min}$ has a value of 1.8 or more.

4. A privacy display apparatus according to claim 1, wherein the display device has a major axis and a minor axis of symmetry, and the equation for $Y_{upper}$ applies for an observation direction having a polar angle θ of 45° from the normal to the display device at an azimuth angle corresponding to at least one of the major axis and the minor axis.

5. A privacy display apparatus according to claim 1, wherein the control system is arranged to control luminance of the displayed image when the privacy function is provided on the basis of the detected level of the ambient light in accordance with a transfer function that maintains a relationship $Y_{max} \geq Y_{lower}$, where $Y_{lower}$ is given by the equation:

$$Y_{lower} = \frac{(\rho(\Delta\theta = 10°)/P(\Delta\theta = 10°)) \cdot I}{(10^{S_{max}} - 1) \cdot \pi}$$

where
the equation for $P_{lower}$ applies for an observation direction having a polar angle θ of 10° from the direction of the maximum output luminance of the display device at at least one azimuth angle around the direction of the maximum output luminance of the display device,
$\rho(\Delta\theta=10°)$ is the reflectivity of the display device along the observation direction having a polar angle θ of 10° from direction of the maximum output luminance of the display device,
$P(\Delta\theta=10 20)$ is the ratio of the luminance of the display device along the observation direction having a polar angle θ of 10° from the direction of the maximum output luminance of the display device to the maximum output luminance $Y_{max}$ of the display device, and
$S_{max}$ has a value of 0.1 or less.

6. A privacy display apparatus according to claim 1, wherein the transfer function is shaped as a step function of luminance of the displayed image with increasing detected levels of the ambient light.

7. A privacy display apparatus according to claim 1, wherein I is the detected level of the ambient light incident on the display device along an incident direction for reflection to the observation direction.

8. A privacy display apparatus according to claim 1, wherein the display device is capable of operating in at least a public mode and a privacy mode, wherein in the privacy mode the privacy function is provided and the visibility of the image to an off-axis viewer is reduced compared to the public mode, the control system being capable of selectively operating the display device in the public mode or the privacy mode for at least one region of the display device.

9. A privacy display apparatus according to claim 7, wherein the control system is arranged to selectively operate the display device in the public mode or the privacy mode in response to the detected level of the ambient light.

10. A privacy display apparatus according to claim 8, wherein the transfer function provides higher luminance of the displayed image in the public mode than in the privacy mode.

11. A privacy display apparatus according to claim 1, wherein the display device comprises a backlight and a transmissive spatial light modulator arranged to receive light from the backlight, and
the control system is arranged to control luminance of the displayed image by controlling the luminance of the backlight and/or by controlling transmission of light by the spatial light modulator.

12. A privacy display apparatus according to claim 1, wherein
the display device comprises an emissive spatial light modulator, and
the control system is arranged to control luminance of the displayed image by controlling of emission of light by the spatial light modulator.

13. A privacy display apparatus according to claim 1, wherein the maximum output luminance of the display device is along the normal to the display device.

14. A privacy display apparatus, comprising:
a display device arranged to display an image and capable of operating in at least a public mode and a privacy mode, wherein the visibility of the image to an off-axis viewer is reduced in the privacy mode compared to the public mode; and
a control system arranged to control the display device, the control system being capable of selectively operating the display device in the public mode or the privacy mode;
wherein the display apparatus comprises an ambient light sensor arranged to detect the illuminance level of the ambient light, and
wherein the control system is arranged to selectively control luminance of the displayed image in the public mode and the privacy mode in response to the detected level of the ambient light, in accordance with different transfer functions relating levels of luminance to detected levels of the ambient light in the public mode and in the privacy mode.

15. A privacy display device according to claim 14, wherein the transfer function in the public mode relates higher levels of luminance to detected levels of the ambient light than the transfer function in the privacy mode.

16. A privacy display apparatus, comprising:
a display device arranged to display an image and capable of operating in at least a public mode and a privacy mode, wherein the visibility of the image to an off-axis viewer is reduced in the privacy mode compared to the public mode; and
a control system arranged to control the display device, the control system being capable of selectively operating the display device in the public mode or the privacy mode;
wherein the display apparatus comprises an ambient light sensor arranged to detect the illuminance level of the ambient light, and
wherein the control system is arranged to selectively control luminance of the displayed image in the privacy mode in response to the detected level of the ambient light, in accordance with a transfer function that maintains a relationship $Y_{max}/I\theta \geq 1$ lux/nit where $Y_{max}$ is the maximum output luminance of the display device and $I\theta$ is the detected ambient light level.

17. A privacy display apparatus, comprising:
a display device arranged to display an image and capable of operating in at least a public mode and a privacy mode, wherein the visibility of the image to an off-axis viewer is reduced in the privacy mode compared to the public mode; and
a control system arranged to control the display device, the control system being capable of selectively operating the display device in the public mode or the privacy mode;
wherein the display apparatus comprises an ambient light sensor arranged to detect the illuminance level of the ambient light, and
wherein the control system is arranged to selectively control luminance of the displayed image in the privacy mode in response to the detected level of the ambient light, in accordance with a transfer function that maintains a relationship $Y_{max} \leq Y_{lim}$, where $Y_{max}$ is the maximum output luminance of the display device and $Y_{lim}$ is given by the equation:

$$Y_{lim} = \frac{R\theta + V_{lim} * K\theta}{(V_{lim} - 1) * P\theta}$$

where $V_{lim}$ has a value of 10, $R\theta$ is the reflected ambient illuminance at an observation angle $\theta$ of 45 degrees laterally and zero degrees in elevation from the normal to the display device, $K\theta$ is the display black state luminance at the observation angle, and $P\theta$ is the relative luminance at the observation angle $\theta$ compared to the maximum display output luminance $Y_{max}$.

18. A privacy display apparatus according to claim 14, wherein the control system is arranged to selectively control luminance of at least one light source arranged to provide illumination in an illuminated region that is arranged on the output side of the display;
wherein the illuminated region is arranged to illuminate the front surface of the display device at an acute angle to the normal to the display.

19. A privacy display apparatus, comprising:
a display device arranged to display an image and capable of operating in at least a public mode and a privacy mode, wherein the visibility of the image to an off-axis viewer is reduced in the privacy mode compared to the public mode; and
a control system arranged to control the display device, the control system being capable of selectively operating the display device in the public mode or the privacy mode;
wherein the display apparatus comprises an ambient light sensor arranged to detect the illuminance level of the ambient light,
wherein the control system is arranged to selectively control luminance of at least one light source arranged to provide illumination in an illuminated region that is arranged on the output side of the display,
wherein the illuminated region is arranged to illuminate the front surface of the display device at an acute angle to the normal to the display, and wherein the control system is arranged to provide an illuminance Iθ at an acute angle of −45 degrees laterally and zero degrees in elevation onto the display such that:

$$I\theta > \frac{(10^{S_{lim}} - 1) * \pi * P\theta * Y\max}{\rho\theta}$$

where ρθ is the relative luminance at the observation angle θ and $S_{lim}$ is greater than 1.0, preferably greater than 1.5 and most preferably greater than 2.0.

20. An optical arrangement comprising
a privacy display device according to claim 14, and at least one light source on the output side of the display.

21. An optical arrangement according to claim 20, wherein the light source is arranged to illuminate a light reflecting surface.

22. A vehicle comprising an optical arrangement according to claim 21, wherein the light reflecting surface comprises an internal door panel of the vehicle.

23. A privacy display apparatus according to claim 16, wherein the control system is arranged to selectively control luminance of at least one light source arranged to provide illumination in an illuminated region that is arranged on the output side of the display;
wherein the illuminated region is arranged to illuminate the front surface of the display device at an acute angle to the normal to the display.

24. An optical arrangement comprising
a privacy display device according to claim 16, and at least one light source on the output side of the display.

25. An optical arrangement according to claim 24, wherein the light source is arranged to illuminate a light reflecting surface.

26. A vehicle comprising an optical arrangement according to claim 25, wherein the light reflecting surface comprises an internal door panel of the vehicle.

27. A privacy display apparatus according to claim 17, wherein the control system is arranged to selectively control luminance of at least one light source arranged to provide illumination in an illuminated region that is arranged on the output side of the display;
wherein the illuminated region is arranged to illuminate the front surface of the display device at an acute angle to the normal to the display.

28. An optical arrangement comprising
a privacy display device according to claim 17, and at least one light source on the output side of the display.

29. An optical arrangement according to claim 28, wherein the light source is arranged to illuminate a light reflecting surface.

30. A vehicle comprising an optical arrangement according to claim 29, wherein the light reflecting surface comprises an internal door panel of the vehicle.

31. An optical arrangement comprising
a privacy display device according to claim 19, and at least one light source on the output side of the display.

32. An optical arrangement according to claim 31, wherein the light source is arranged to illuminate a light reflecting surface.

33. A vehicle comprising an optical arrangement according to claim 32, wherein the light reflecting surface comprises an internal door panel of the vehicle.

* * * * *

UNITED STATES PATENT AND TRADEMARK OFFICE
CERTIFICATE OF CORRECTION

PATENT NO. : 11,114,063 B2  
APPLICATION NO. : 17/061118  
DATED : September 7, 2021  
INVENTOR(S) : Woodgate et al.

Page 1 of 1

It is certified that error appears in the above-identified patent and that said Letters Patent is hereby corrected as shown below:

In the Claims

Column 32, Line 48 (of Claim 5):
"P($\Delta\theta$=1020 ) is the reflectivity of the display device"
Should read:
--$\rho(\Delta\theta=10°)$ is the reflectivity of the display device--.

Signed and Sealed this
Twenty-fourth Day of September, 2024

Katherine Kelly Vidal
*Director of the United States Patent and Trademark Office*